United States Patent
Iwashita

(10) Patent No.: US 10,938,713 B2
(45) Date of Patent: Mar. 2, 2021

(54) FLOW CONTROL DEVICE, COMMUNICATION SYSTEM, FLOW CONTROL METHOD, AND RECORDING MEDIUM

(71) Applicant: NEC CORPORATION, Tokyo (JP)

(72) Inventor: Naoyuki Iwashita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 491 days.

(21) Appl. No.: 15/775,079

(22) PCT Filed: Nov. 18, 2016

(86) PCT No.: PCT/JP2016/084303
§ 371 (c)(1),
(2) Date: May 10, 2018

(87) PCT Pub. No.: WO2017/090535
PCT Pub. Date: Jun. 1, 2017

(65) Prior Publication Data
US 2020/0296031 A1 Sep. 17, 2020

(30) Foreign Application Priority Data

Nov. 24, 2015 (JP) .............................. JP2015-228711

(51) Int. Cl.
*H04L 12/753* (2013.01)
*H04L 12/721* (2013.01)
(Continued)

(52) U.S. Cl.
CPC ............ *H04L 45/48* (2013.01); *H04L 45/122* (2013.01); *H04L 45/24* (2013.01); *H04L 45/38* (2013.01); *H04L 45/42* (2013.01)

(58) Field of Classification Search
None
See application file for complete search history.

(56) References Cited

U.S. PATENT DOCUMENTS 9,794,165 B1 * 10/2017 Wood ...................... H04L 45/50
2005/0201274 A1 * 9/2005 Guerin ................. H04L 45/123
370/217

(Continued)

FOREIGN PATENT DOCUMENTS

JP 2002-124976 A 4/2002
JP 2015-524237 A 8/2015

(Continued)

OTHER PUBLICATIONS

Nobuhiko Itoh et al., "Flow Entry Reduction Scheme Considering Path Switching for OpenFlow-based Networks", IEICE Technical Report, Jan. 16, 2014, pp. 47-52, vol. 113, No. 388.

(Continued)

*Primary Examiner* — Otis L Thompson, Jr.
(74) *Attorney, Agent, or Firm* — Sughrue Mion, PLLC

(57) ABSTRACT

Provided is a flow control device for suppressing a consumption of a network bandwidth in multipoint-to-multipoint communication. The flow control device is a device for controlling a plurality of flow-processing devices that process a packet for predetermined communication. The flow control device include first means for calculating, for each of predetermined flow-processing devices located at an edge to an external network, a shortest path to another of the predetermined flow-processing devices, second means for determining, based on a number of times a link between flow-processing devices is included in the shortest path, a candidate link used in a communication path for the predetermined communication; and third means for calculating a candidate communication path for the predetermined communication, based on the determined candidate link.

10 Claims, 23 Drawing Sheets

(51) Int. Cl.
*H04L 12/707* (2013.01)
*H04L 12/733* (2013.01)
*H04L 12/717* (2013.01)

(56) References Cited

U.S. PATENT DOCUMENTS

| | | | |
|---|---|---|---|
| 2008/0232275 A1* | 9/2008 | Eswaran | H04L 12/4625 370/256 |
| 2011/0141877 A1* | 6/2011 | Xu | H04L 41/0654 370/216 |
| 2012/0039161 A1* | 2/2012 | Allan | H04L 45/28 370/216 |
| 2017/0026263 A1* | 1/2017 | Gell | G06F 16/1844 |
| 2017/0163443 A1* | 6/2017 | Chen | H04L 45/124 |
| 2018/0054772 A1* | 2/2018 | Tan | H04W 40/12 |

FOREIGN PATENT DOCUMENTS

| | | |
|---|---|---|
| JP | 2015-195479 A | 11/2015 |
| WO | 2011/043379 A1 | 4/2011 |
| WO | 2011/118566 A1 | 9/2011 |
| WO | 2014/019924 A2 | 2/2014 |
| WO | 2014/077306 A1 | 5/2014 |

OTHER PUBLICATIONS

Written Opinion for PCT/JP2016/084303, dated Feb. 7, 2017.
International Search Report for PCT/JP2016/084303, dated Feb. 7, 2017.

* cited by examiner

FLOW CONTROL DEVICE, COMMUNICATION SYSTEM, FLOW CONTROL METHOD, AND RECORDING MEDIUM

CROSS REFERENCE TO RELATED APPLICATIONS

This application is a National Stage of International Application No. PCT/JP2016/084303 filed Nov. 18, 2016, claiming priority based on Japanese Patent Application No. 2015-228711 filed Nov. 24, 2015, the disclosure of which is incorporated herein in its entirety by reference.

TECHNICAL FIELD

The present invention relates to a flow control device, a communication system, a flow control method, a recording medium, and the like.

BACKGROUND ART

In multipoint-to-multipoint communication, a centralized control-type network is employed. PTL 1 discloses a network with a flow control. In PTL 1, a flow control device intensively manages a flow that is a packet group of the same type and thereby flexibly operates a network. The flow control device notifies a flow-processing device that processes a flow of information relating to processing of the flow. The flow-processing device executes processing such as discard and transfer for the flow, based on the notified information.

PTL 2 describes a technique for calculating a new path that does not pass through a node of a detour target, and setting, to a node configuring the new path, flow information that specify flow processing.

PTL 3 describes a technique for executing path selection considering a network resource between end-to-end in an inter-domain network.

CITATION LIST

Patent Literature

[PTL 1] International Publication No. WO 2014/19924
[PTL 2] International Publication No. WO 2011/043379
[PTL 3] Japanese Patent Application Laid-open Publication No. 2002-124976

SUMMARY OF INVENTION

Technical Problem

As described above, in the flow control described in PTL 1, processing of a flow (e.g. processing such as discard and transfer) is executed by the flow-processing device. Therefore, when delivery in multipoint-to-multipoint communication is executed, in the flow control described in PTL 1, delivery is executed for all flow-processing devices, and in each flow-processing device, processing for the delivery (processing of discard or output to an external NW edge) is executed. Therefore, in the flow control described in PTL 1, the delivery is also executed for a flow-processing device for which the delivery is not needed, and a bandwidth of a network is uselessly consumed.

In view of the above-described issues, an object of the present invention is to provide a flow control device, a communication system, a communication method, and a program capable of suppressing a consumption increase in a network bandwidth in multipoint-to-multipoint communication.

Solution to Problem

A flow control device according to an exemplary aspect of the present invention is a flow control device for controlling a plurality of flow-processing devices that process a packet for predetermined communication, and includes: first means for calculating, for each of predetermined flow-processing devices located at an edge to an external network, a shortest path to another of the predetermined flow-processing devices; second means for determining, based on a number of times a link between flow-processing devices is included in the shortest path, a candidate link used in a communication path for the predetermined communication; and third means for calculating a candidate communication path for the predetermined communication, based on the determined candidate link.

A communication system according to an exemplary aspect of the present invention includes: a plurality of flow-processing devices that process a packet for predetermined communication; and a flow control device that controls the plurality of flow-processing devices, wherein the flow control device includes: first means for calculating, for each of predetermined flow-processing devices located at an edge to an external network, a shortest path to another of the predetermined flow-processing devices, second means for determining, based on a number of times a link between flow-processing devices is included in the shortest path, a candidate link used in a communication path for the predetermined communication, and third means for calculating a candidate communication path for the predetermined communication, based on the determined candidate link.

A flow control method according to an exemplary aspect of the present invention is a flow control method in a flow control device for controlling a plurality of flow-processing devices that process a packet for predetermined communication, and includes calculating, for each of predetermined flow-processing devices located at an edge to an external network, a shortest path to another of the predetermined flow-processing devices; determining, based on a number of times a link between flow-processing devices is included in the shortest path, a candidate link used in a communication path for the predetermined communication; and calculating a candidate communication path for the predetermined communication, based on the determined candidate link.

A program according to an exemplary aspect of the present invention is a program causing a computer for a flow control device for controlling a plurality of flow-processing devices that process a packet for predetermined communication, and performs processes including: calculating, for each of predetermined flow-processing devices located at an edge to an external network, a shortest path to another of the predetermined flow-processing devices; determining, based on a number of times a link between flow-processing devices is included in the shortest path, a candidate link used in a communication path for the predetermined communication; and calculating a candidate communication path for the predetermined communication, based on the determined candidate link.

A computer readable storage medium recording thereon the above program may be included as an exemplary aspect of the present invention.

Advantageous Effects of Invention

The flow control device, the communication system, the flow control method, the program, and the like according to the present invention can suppress a consumption increase in a network bandwidth in multipoint-to-multipoint communication.

DESCRIPTION OF EMBODIMENTS

Example embodiments and examples of the present invention will be described with reference to the accompanying drawings. The example embodiments are illustrative, and the present invention is not limited to the example embodiments. A reference sign in a drawing additionally provided in this summary is assigned to each component as one example for assisting understanding, as a matter of convenience, and description of this summary is not intended to limit anything.

First Example Embodiment

Figure 1:
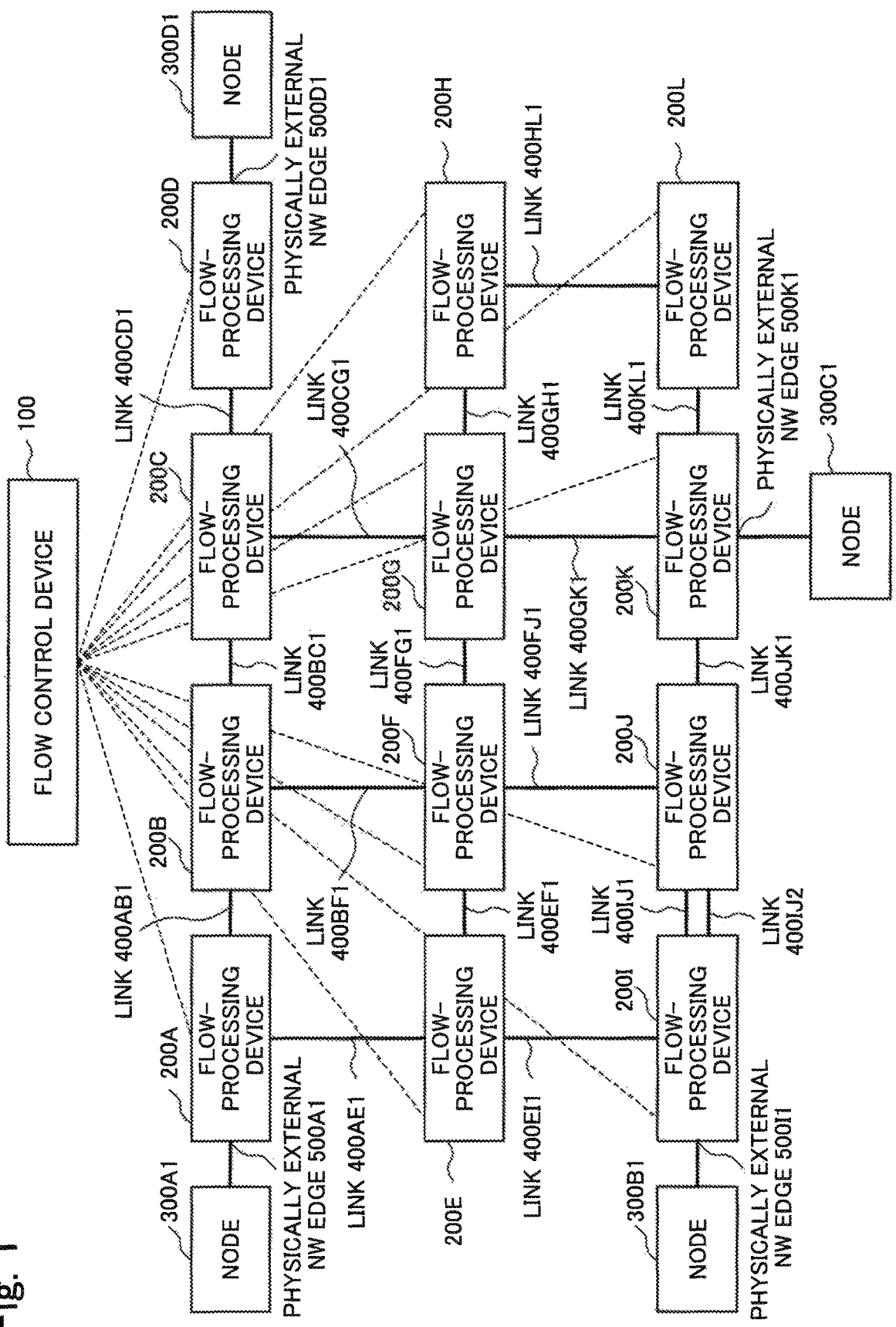
FIG. 1 is a configuration example of a communication system of a first example embodiment.

FIG. 1 is a diagram illustrating a configuration example of a communication system in a first example embodiment of the present invention.

The communication system in the first example embodiment calculates a delivery tree passing through the minimum necessary number of flow-processing devices for a partial set of physically external NW edges used for multipoint-to-multipoint communication.

As described in FIG. 1, the communication system of the first example embodiment includes a flow control device 100, flow-processing devices 200 (each of 200A to 200L), nodes 300 (each of 300A1 to 300D1), links 400 (each of 400AB1 to 400KL1), and physically external NW edges 500 (each of 500A1, 500D1, 50011, and 500K1).

The flow control device 100 can manage, for example, a node that executes packet processing, in centralized management type architecture.

The centralized management type architecture is, for example, an OpenFlow network. In the OpenFlow network, a conventional switch mechanism is separated into an OpenFlow controller (OFC) that is a module for executing path determination processing which can be modified from external programming, and an OpenFlow switch (OFS) that is a module for executing packet transfer processing.

The OFS in the OpenFlow network includes an edge switch and a core switch that form the OpenFlow network, and are controlled by the OFC. In the OpenFlow network, the OFC controls a behavior of the OFS by manipulating a flow table of the OFS.

The flow table refers to a table in which a flow entry is registered. In the flow entry, a predetermined operation (action) to be performed for a packet (communication data) adapted to (matched with) a predetermined condition (rule) is defined.

Each OFS stores at least one flow table. The OFC stores all flow tables respectively including the same contents as contents of subordinate flow tables of the OFSs. In other words, the OFC stores a master table of a flow table of each of the OFSs. Note that "Storing a flow table" indicates managing the flow table. When the flow table can be managed via a network and the like, actually, the flow table may not exist in an own inside. It is conceivable that, for example, the OFC and the OFS share the same flow table existing on a network.

A rule for a flow entry is defined and distinguished by various combinations of one or more of or all of a destination address, a source address, a destination port, and a source port included in a header area of each protocol layer of a packet. It is assumed that the above addresses include a media access control address (MAC address) and an Internet protocol address (IP address). Further, in addition to the above, information of an ingress port is also usable as a rule for a flow entry. Further, as a rule for a flow entry, a rule in which a part (or the whole) of values in a header area of a packet for identifying a flow is expressed by a regular expression or a wild card (*) may be set.

The OFS processes a packet matched with a content described in a column of a rule in accordance with a content described in a column of an action. The OFC registers such a flow entry in the OFS, and thereby can control processing for the matched packet.

The OFS reads, when a packet arrives, header information (source information and destination information) of the packet, and searches a local flow table for a flow entry (hereinafter, referred to as a matched flow entry) including a matched rule. As a result of the search, when a matched flow entry has been found, the OFS processes the packet as described in an action of the flow entry. Note that when a plurality of flow entries has been found, a packet is processed according to a flow entry having a highest priority among the found flow entries. Further, as a result of the search, when a matched flow entry has not been found, the OFS determines the packet as a "first packet", transfers a copy (duplicate) of the packet to the OFC, and thereby inquires of the OFC how to process the packet.

The OFC executes path calculation when receiving the inquiry from the OFS and derives an optimum path for transferring a packet for which the inquiry has been received to a destination. Further, the OFC newly, additionally register a flow entry for configuring the derived path in the flow table of each of the OFSs. At that time, the OFC newly, additionally registers the same flow entry also in the local flow table.

The flow control device 100 manages (performs flow management) information relating to a communication path between nodes 300 (information indicating flow-processing devices 200 and links 400 through which a packet is processed). The flow control device 100 instructs one or more flow-processing devices 200 to perform flow setting for processing a frame input from a flow-processing device 200.

The flow-processing device 200, with respect to an input frame from the node 300 or another flow-processing device 200, refers to a flow table set by the instruction of the flow control device 100 and processes the input frame in accordance with a matched condition. The flow-processing device 200 outputs the input frame (e.g. output to the node 300, output to another flow-processing device 200, or output to the flow control device 100) or discards (drops) the input frame.

The node 300 transmits a frame whose destination is another node 300 to the flow-processing device 200, or receives a frame whose source is another node 300 from the flow-processing device 200.

The node 300 is, for example, a mobile phone, a personal computer (PC), a mobile router, a smart device (e.g. a smart meter that monitors home power consumption, a smart television, or a wearable terminal), a machine-to-machine (M2M) device, or the like. The M2M device includes, in addition to the above devices, for example, industrial equipment, a car, healthcare equipment, and a home electrical appliance.

The flow-processing device 200 connected to the node 300 is an edge flow-processing device (hereinafter, referred to also as an "edge flow-processing device 200"). Further, the flow-processing device 200 connected only to another flow-processing device 200 is a core flow-processing device (hereinafter, referred to also as a "core flow-processing device 200"). The core flow-processing device may not exist, depending on a configuration of a flow network. In the communication system of the first example embodiment, the flow-processing devices 200A, 200D, 200I, and 200K are edge flow-processing devices, and other than these flow-processing devices 200 are core flow-processing devices.

The link 400 connects flow-processing devices 200. The link 400 has, in each end thereof, a physical port of the flow-processing device 200. A NW device used as a repeater may be disposed between physical ports of the flow-processing devices 200.

A plurality of links 400 may be disposed between two flow-processing devices 200 such as between the flow-processing devices 200I and 200J, and thereby redundancy is increased.

The physically external NW edge 500 is a physical edge that is a boundary between the flow network and the node 300, and is a physical port for external NW connection of the flow-processing device 200.

In the communication system of the first example embodiment, the node 300 does not need to be directly connected to the edge flow-processing device 200 and may be connected via an L2 switch (SW). Further, the node 300 may be an L3SW or a router, and another node 300 may exist in addition to the node 300.

Figure 2:
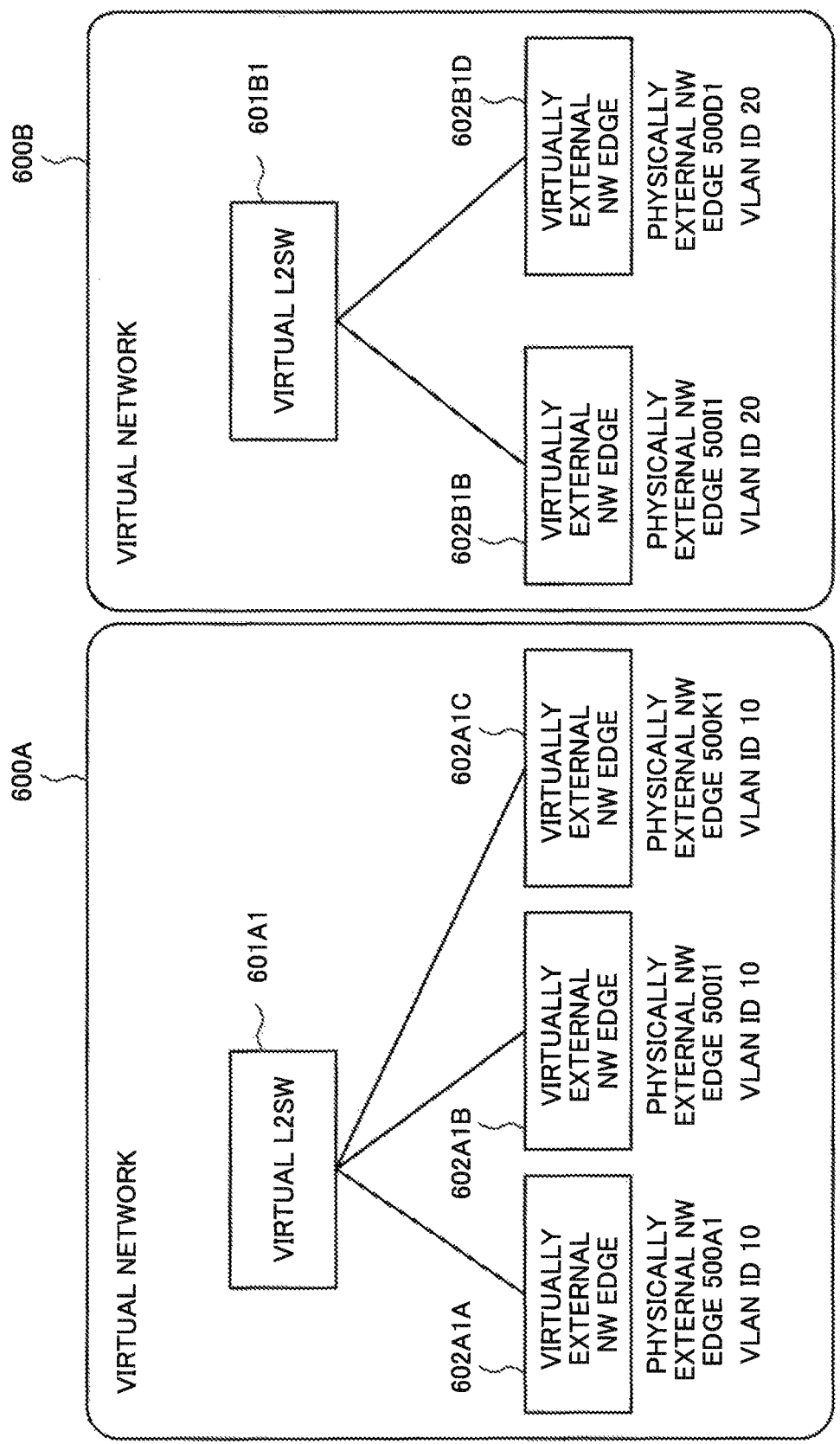
FIG. 2 is another configuration example of the communication system of the first example embodiment.

FIG. 2 is another configuration example of the communication system of the first example embodiment.

In FIG. 2, the flow network illustrated in FIG. 1 is virtualized by an L2SW as a virtual network 600. When a flow network is virtualized, operability for a user is improved.

A virtual network 600A includes a virtual L2SW 601A1 that is a virtual node and three virtually external NW edges 602. A virtually external NW edge 602A1A is mapped to a VLAN ID 10 of a port that is a physically external NW edge 500A1 in a flow network. Further, a virtually external NW edge 602A1B is mapped to a VLAN ID 10 of a port that is a physically external NW edge 500I1, and a virtually external NW edges 602A1C is mapped to a VLAN ID 10 of a port that is a physically external NW edge 500K1.

Similarly, a virtual network 600B includes a virtual L2SW 601B1 that is a virtual node and two virtually external NW edges 602B1B and 602B1D. In the virtual network 600B, a virtually external NW edge 602B1B and a virtually external NW edges 602B1D are mapped to a VLAN ID 20 of a port that is a physically external NW edge 500I1 and a VLAN ID 20 of a port that is a physically external NW edge 500D1, respectively.

Figure 3:
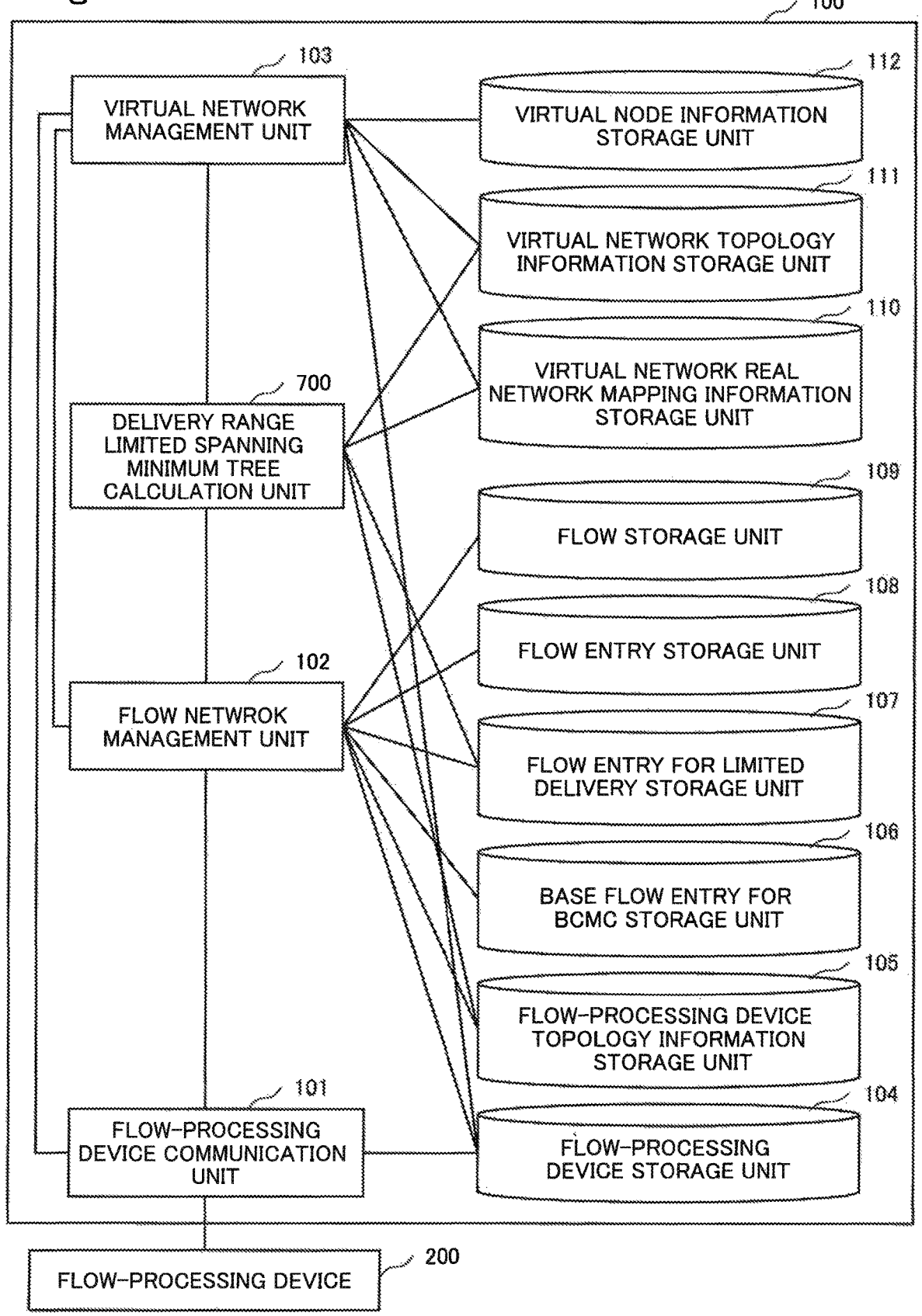
FIG. 3 is a configuration example of a flow control device of the first example embodiment.

FIG. 3 is a diagram illustrating a configuration example of the flow control device 100 in the first example embodiment.

The flow control device 100 includes a flow-processing device communication unit 101, a flow network management unit 102, a virtual network management unit 103, a flow-processing device storage unit 104, a flow-processing device topology information storage unit 105, a base flow entry for BCMC storage unit 106, a flow entry for limited delivery storage unit 107, a flow entry storage unit 108, a flow storage unit 109, a virtual network real network mapping information storage unit 110, a virtual network topology information storage unit 111, and a virtual node information storage unit 112.

The flow-processing device communication unit 101 receives flow-processing device information, input frame information, and flow entry removal information due to a time-out from the flow-processing device 200. The flow-processing device communication unit 101 outputs the received flow-processing device information and the like, to the flow network management unit 102 and the virtual network management unit 103.

The flow-processing device communication unit 101 receives output frame information from the virtual network management unit 103, and information relating to setting and reference, with respect to a flow entry, from the flow network management unit 102. Further, the flow-processing device communication unit 101 receives a request relating to reference to flow-processing device information from the virtual network management unit 103 and the flow network management unit 102, refers to the flow-processing device storage unit 104, and transfers predetermined information to the flow-processing device 200.

The flow network management unit 102 sets the flow-processing device information from the flow-processing device communication unit 101 in the flow-processing device storage unit 104. Further, the flow network management unit 102 sets flow-processing device topology information in the flow-processing device topology information storage unit 105, based on the information stored on the flow-processing device storage unit 104 and the input frame information. The flow network management unit 102 determines a base flow for a broadcast/multicast frame, based on the flow-processing device topology information. The flow network management unit 102 sets, based on the determined base flow, a base flow entry for broadcast/multicast (BCMC), for a broadcast/multicast frame with respect to each of the flow-processing devices 200, in the base flow entry for BCMC storage unit 106.

Further, the flow network management unit 102 sets virtual node information and virtual network topology information obtained from the virtual network management unit 103 in the flow entry storage unit 108. Further, the flow network management unit 102 sets mapping information obtained from the virtual network real network mapping information storage unit 110 and a flow entry for BCMC in the flow entry storage unit 108. The flow network management unit 102 sets, based on the information set in the flow entry storage unit 108, a flow entry in the flow-processing device 200 via the flow-processing device communication unit 101.

Further, the flow network management unit 102 determines a flow entry, based on flow setting information obtained from the virtual network management unit 103 and the flow-processing device topology information. The flow network management unit 102 sets the flow setting information in the flow storage unit 109, sets the flow entry in the flow entry storage unit 108, and sets the flow entry in the flow-processing device 200 via the flow-processing device communication unit 101.

Further, the flow network management unit 102 determines a multipoint-to-multipoint communication flow entry, based on a tree calculated by a delivery range limited spanning minimum tree calculation unit 700. The flow network management unit 102 sets the determined multipoint-to-multipoint communication flow entry in the flow entry for limited delivery storage unit 107, and sets the flow entry in the flow-processing device 200 via the flow-processing device communication unit 101.

The virtual network management unit 103 sets the virtual node information with respect to a plurality of virtual networks in the virtual node information storage unit 112, and sets information relating to a connection relation between virtual nodes for each virtual network in the virtual network topology information storage unit 111. Further, the virtual network management unit 103 stores the mapping settings of a virtually external NW edge 602 and a physically external NW edge 500 on the virtual network real network mapping information storage unit 110. The virtual network management unit 103 transfers the virtual node information, the virtual network topology information, and the virtual network real network mapping information to the flow network management unit 102. Further, the virtual network management unit 103 processes input frame information from the flow-processing device communication unit 101, based on the virtual network topology information. At that time, the input frame information may be discarded (dropped), the input frame information may be received by a virtual node such as the virtual L2SW 601 serving as a host, or a virtual node may output output frame information from the virtually external NW edge 602. The virtual network management unit 103 outputs output frame information to the flow-processing device 200 via the flow-processing device communication unit 101. Further, the virtual network management unit 103 may request the flow network management unit 102 to execute flow setting by using the flow setting information based on the input frame information from the flow-processing device communication unit 101 and output frame information to the flow-processing device communication unit 101 associated with the input frame information.

The delivery range limited spanning minimum tree calculation unit 700 calculates a delivery range limited spanning minimum tree 740. The delivery range limited spanning minimum tree calculation unit 700 sets, based on the information of the virtual network topology information storage unit 111 and the virtual network real network mapping information storage unit 110, a partial set of the physically external NW edges 500 that perform multipoint-to-multipoint communication obtained from configuration of the virtually external NW edges 602 of a predetermined virtual network 600, in the flow-processing device topology information storage unit 105. The delivery range limited spanning minimum tree calculation unit 700 calculates a delivery range limited spanning minimum tree 740, based on information of the links 400 in the flow-processing device topology information storage unit 105. The delivery range limited spanning minimum tree calculation unit 700 sets the calculated delivery range limited spanning minimum tree 740 in the flow network management unit 102.

The flow-processing device storage unit 104 stores flow-processing device information of the flow-processing device 200 with respect to each of the flow-processing devices 200. The flow-processing device information is, for example, port information and VLAN setting information of the flow-processing device, an ability of the flow-processing device, and an address for accessing the flow-processing device. The flow-processing device information may include statistical information.

The flow-processing device topology information storage unit 105 stores the topology information of the flow network that is information of the link 400 between the flow-processing devices 200, such as connection information and a connection destination of a port.

The base flow entry for BCMC storage unit 106 stores, with respect to each of the flow-processing devices, the base flow entry for the broadcast/multicast flow in the flow network. Further, the base flow entry for BCMC storage unit 106 stores information of connection port to another flow-processing device 200 for loop-free. The flow control device 100 of the first example embodiment realizes resource saving for flow entries by using a common spanning minimum tree that performs delivery to all the flow-processing devices 200 being delivery destinations in the flow network. The flow entry for limited delivery storage unit 107 stores, with respect to each of the flow-processing devices 200, the multipoint-to-multipoint communication flow entry that is generated from the delivery range limited spanning minimum tree 740 and set in the flow-processing device 200.

The flow entry storage unit 108 stores, with respect to each of the flow-processing devices 200, the flow entry according to the flow setting information set in the flow-processing device 200.

The flow storage unit 109 stores the flow setting information. The flow setting information stored by the flow storage unit 109 includes, for example, a condition for matching as a flow with respect to pieces of input frame information to the flow network and a state of an output frame upon being output from the flow network.

The virtual network real network mapping information storage unit 110 stores the mapping information of the virtually external NW edge 602 and the physically external NW edge 500. The virtual network real network mapping information storage unit 110 stores information relating to a correspondence relation among the flow-processing device 200, the physically external NW edge 500, and a VLAN ID in the flow network managed by the flow control device 100 and a relation with the virtual network 600, with respect to the virtually external NW edge 602 on which an input frame is input to the flow network and the virtually external NW edge 602 on which an output frame is output.

The virtual network topology information storage unit 111 stores the information relating to a connection between virtual nodes and information relating to the virtually external NW edges 602, with respect to each virtual network 600.

The virtual node information storage unit 112 stores pieces of the virtual node information relating to the virtual L2SW 601 and the virtually external NW edge 602 and the like, respectively, with respect to each virtual network. The virtual node information storage unit 112 stores, for the virtual L2SW 601, similar to information relating to the L2SW, information such as virtual interface information and MAC entry information and the like, and a relation with the virtual network 600.

Figure 4:
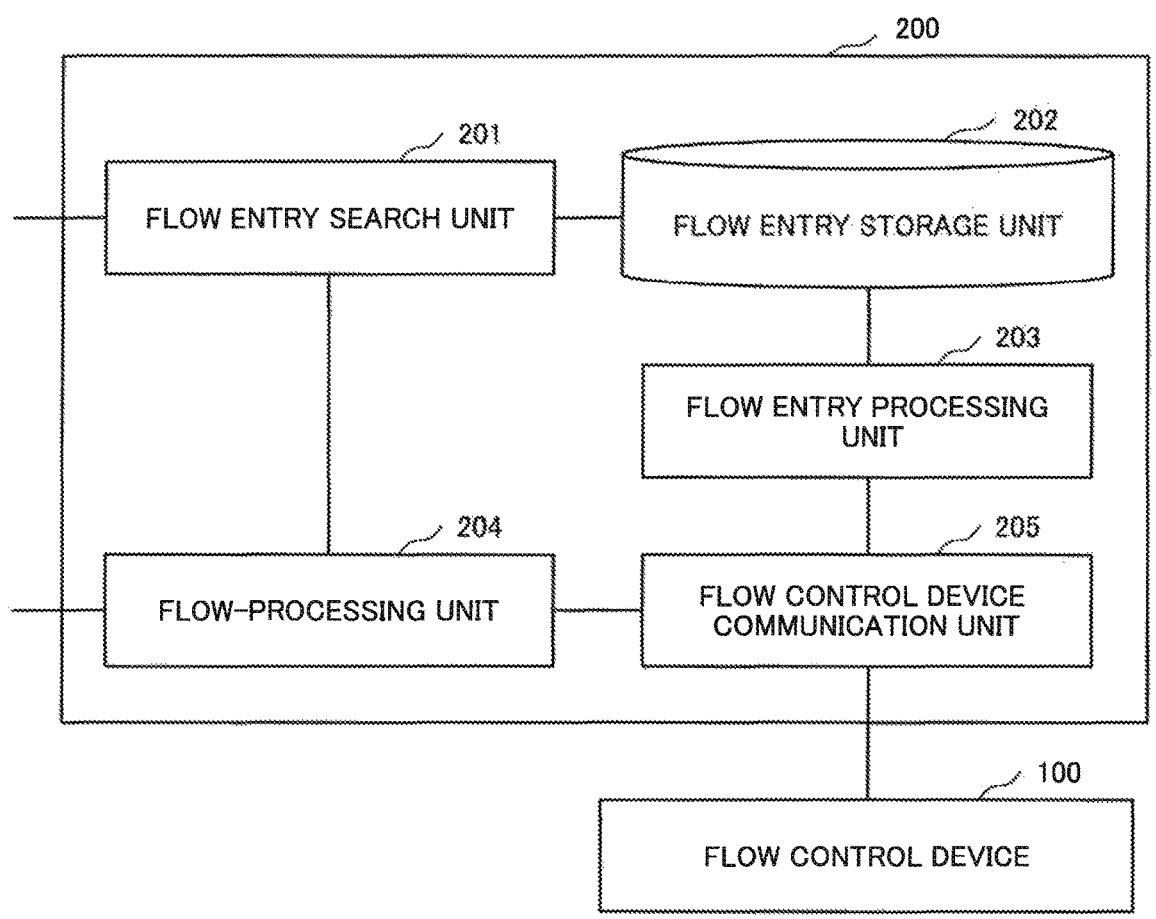
FIG. 4 is a configuration example of a flow-processing device of the first example embodiment.

FIG. 4 is a diagram illustrating a configuration example of the flow-processing device 200 in the first example embodiment.

The flow-processing device 200 includes a flow entry search unit 201, a flow entry storage unit 202, a flow entry processing unit 203, a flow-processing unit 204, and a flow control device communication unit 205.

The flow entry search unit 201 extracts flow entry search condition information for searching for a flow entry, from a frame input to the flow-processing device 200. The flow entry search unit 201 searches the flow entry storage unit 202 by using the flow entry search condition information. When there are a time-out time, statistical information, and the like for a matched flow entry, the flow entry search unit 201 updates them. The flow entry search unit 201 transfers an action of the matched flow entry and the input frame to the flow-processing unit 204.

The flow entry storage unit 202 stores a flow entry used in the flow-processing device 200 for processing a frame. In the flow entry storage unit 202, setting such as addition/removal and the like of a flow entry, and reference thereto are executed from the flow entry processing unit 203. In the flow entry storage unit 202, search for a flow entry and update of a matched flow entry are executed from the flow entry search unit 201. A flow entry stored by the flow entry storage unit 202 corresponds to a flow entry stored by the flow control device 100 (specifically, the base flow entry for BCMC storage unit 106, the flow entry for limited delivery storage unit 107, and the flow entry storage unit 108) with respect to the flow-processing device 200.

The flow entry processing unit 203 instructs the flow entry storage unit 202 to perform setting such as addition/removal of and reference to a flow entry notified from the flow control device 100 via the flow control device communication unit 205. The flow entry processing unit 203 refers to the flow entry storage unit 202, removes a time-out flow entry among flow entries, and notifies the flow control device 100 that the flow entry has been removed, via the flow control device communication unit 205.

The flow-processing unit 204 changes, according to an input frame notified from the flow control device 100 via the flow entry search unit 201 or the flow control device communication unit 205 and an action for the input frame, a value of the frame. Further, the flow-processing unit 204 outputs the input frame to the node 300, outputs the input frame to another flow-processing device 200, outputs the input frame to the flow control device 100 via the flow control device communication unit 205, or discards (drops) the input frame.

Figure 5:
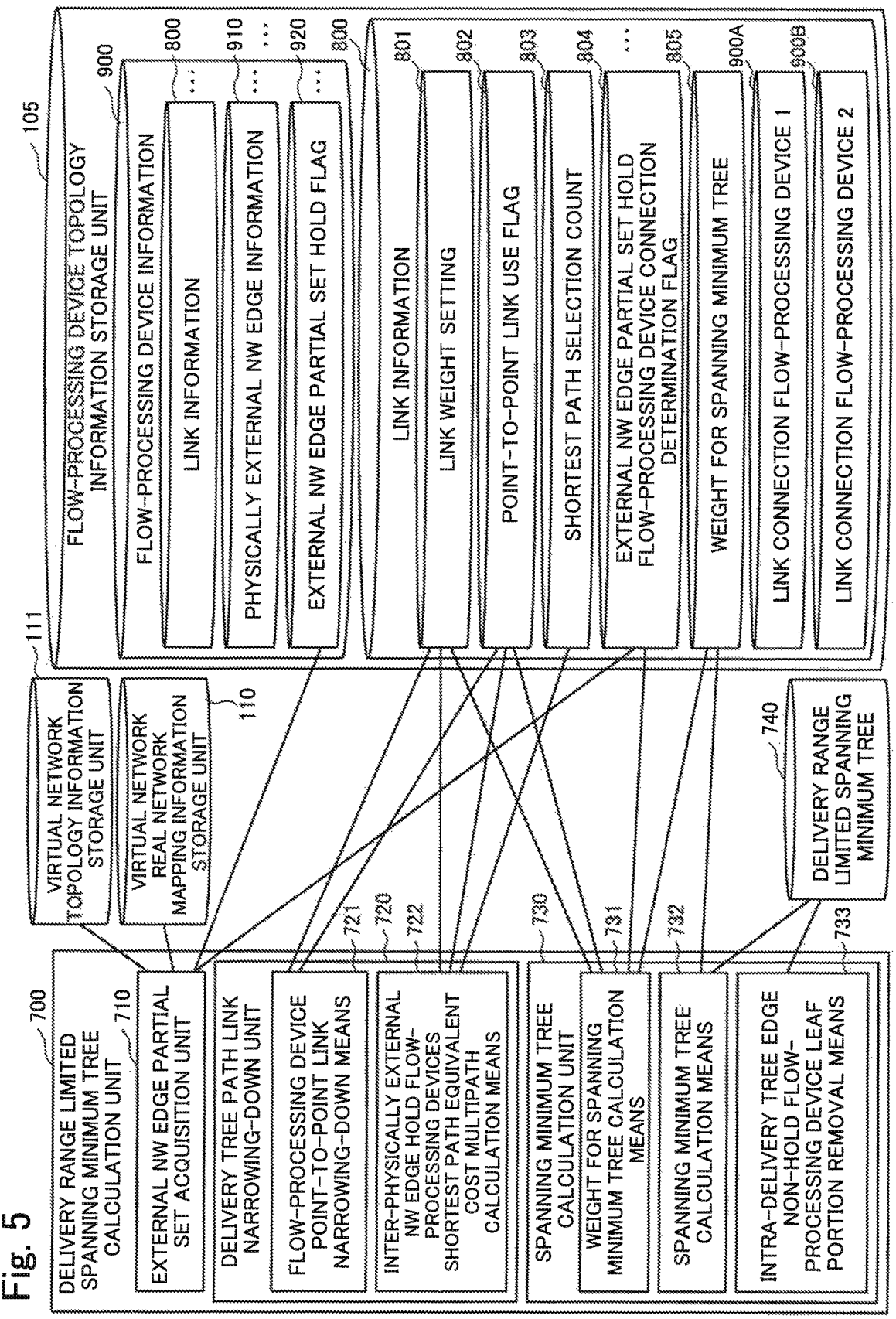
FIG. 5 is a configuration example of a delivery range limited spanning minimum tree calculation unit 700 and a flow-processing device topology information storage unit 105 of the first example embodiment.

FIG. 5 is a diagram illustrating a configuration example of the delivery range limited spanning minimum tree calculation unit 700 and the flow-processing device topology information storage unit 105 in the first example embodiment.

The delivery range limited spanning minimum tree calculation unit 700 includes an external NW edge partial set acquisition unit 710, a delivery tree path link narrowing-down unit 720, and a spanning minimum tree calculation unit 730.

The external NW edge partial set acquisition unit 710 acquires a list of virtually external NW edges 602 of a certain virtual network 600 from the virtual network topology information storage unit 111. The external NW edge partial set acquisition unit 710 acquires a partial set of physically external NW edges 500 that are mapped to the virtually external NW edges 602 and perform multipoint-to-multipoint communication, from information of the virtual network real network mapping information storage unit 110. The external NW edge partial set acquisition unit 710 updates an external NW edge partial set hold flag 920 in flow-processing device information 900 and an external NW edge partial set hold flow-processing device connection determination flag 804 in link information 800.

The delivery tree path link narrowing-down unit 720 includes a flow-processing device point-to-point link narrowing-down means 721 and an inter-physically external NW edge hold flow-processing devices shortest path equivalent cost multipath calculation means 722 (hereinafter, also described simply as a "calculation means 722"). The delivery tree path link narrowing-down unit 720 narrows down links 400 to those to be used as calculation targets in the spanning minimum tree calculation unit 730.

The flow-processing device point-to-point link narrowing-down means 721 selects, when a plurality of links 400 exists between two flow-processing devices, one of links 400 with high priority whose value of a link weight setting 801 is lowest. The flow-processing device point-to-point link narrowing-down means 721 narrows down links 400, updating a point-to-point link use flag 802, based on the selected link 400. By the flow-processing device point-to-point link narrowing-down means 721, the links are narrowed down to target links of path calculation in the inter-physically external NW edge hold flow-processing devices shortest path equivalent cost multipath calculation means 722.

The inter-physically external NW edge hold flow-processing devices shortest path equivalent cost multipath calculation means 722, by using the link weight setting 801 and the point-to-point link use flag 802, calculates a multipath which is a shortest path and has an equivalent cost, with respect to each of all combinations of flow-processing devices 200 each hold a physically external NW edge included in the partial set of the physically external NW edges for multipoint-to-multipoint communication. The inter-physically external NW edge hold flow-processing devices shortest path equivalent cost multipath calculation means 722 stores the number of times of selection for a shortest path in a shortest path selection count 803, excludes a link 400 which has not been selected for a shortest path from calculation target links, and thereby narrows down links 400 to be selected.

The spanning minimum tree calculation unit 730 includes a weight for spanning minimum tree calculation means 731, a spanning minimum tree calculation means 732, and an intra-delivery tree edge non-hold flow-processing device leaf portion removal means 733.

The weight for spanning minimum tree calculation means 731 refers to, when the link weight settings 801 are the same, the shortest path selection count 803 and the external NW edge partial set hold flow-processing device connection determination flag 804 to calculate a weight for spanning minimum tree 805 of a link 400. The weight for spanning minimum tree 805 is a value for preferentially selecting a link 400 having a large number of times of selection for a shortest path and being connected to the flow-processing device 200 that holds the physically external NW edge included in a partial set of physically external NW edges 500 for multipoint-to-multipoint communication.

The spanning minimum tree calculation means 732 calculates a delivery range limited spanning minimum tree 740, based on the weight for spanning minimum tree 805.

The intra-delivery tree edge non-hold flow-processing device leaf portion removal means 733 removes, from the delivery range limited spanning minimum tree 740 calculated by the spanning minimum tree calculation means 732, a core flow-processing device 200 located as a leaf in the delivery tree.

The flow-processing device topology information storage unit 105 stores the flow-processing device information 900 and the link information 800.

The flow-processing device information 900 includes a list of pieces of link information 800 with respect to the links hold by the flow-processing device 200, a list of pieces of physically external NW edge information 910 with respect to the physically external NW edges hold by the flow-processing device 200, and the external NW edge partial set hold flag 920.

The external NW edge partial set hold flag 920 is a flag indicating that the flow-processing device is a flow-processing device 200 that holds any physically external NW edge 500 included in a set of physically external NW edges 500 mapped to virtually external NW edges 602 of a predetermined virtual network 600 (i.e. any physically external NW edge 500 included in a partial set of physically external NW edges 500 for multipoint-to-multipoint communication).

The link information 800 includes link connection flow-processing device information 900 (link connection flow-processing device information 900A and link connection flow-processing device information 900B) relating to two flow-processing devices 200 connected to both edges of a link 400, the link weight setting 801, the point-to-point link use flag 802, the shortest path selection count 803, the external NW edge partial set hold flow-processing device connection determination flag 804, and the weight for spanning minimum tree 805.

The link weight setting 801 indicates a link cost upon calculating a tree in a graph theory. The link weight setting 801 is determined by a line speed of a port of the flow-processing device 200 connected to the link 400 or priority setting by the user. A priority of the link is higher as a value of the link weight setting 801 is smaller.

The point-to-point link use flag 802 is information indicating a link 400 selected by the flow-processing device point-to-point link narrowing-down means 721 between two adjacent flow-processing devices 200.

The shortest path selection count 803 is information calculated by the inter-physically external NW edge hold flow-processing devices shortest path equivalent cost multipath calculation means 722. The shortest path selection count 803 is used when the weight for spanning minimum tree calculation means 731 calculates the weight for spanning minimum tree 805. A purpose of using the shortest path selection count 803 is to preferentially select a link 400 commonly used for shortest paths.

The external NW edge partial set hold flow-processing device connection determination flag 804 is information calculated by the external NW edge partial set acquisition unit 710. The external NW edge partial set hold flow-processing device connection determination flag 804 is used when the weight for spanning minimum tree calculation means 731 calculates the weight for spanning minimum tree 805. A value thereof is designated as 0 upon hold and is designated as 1 upon non-hold. An initial value of the flag is designated as 1. A purpose of using the external NW edge partial set hold flow-processing device connection determination flag 804 is to preferentially select a path not passing through the core flow-processing device 200 but passing through the edge flow-processing device 200 when there are a plurality of paths having the same shortest path selection count 803 in an equivalent cost multipath.

Figure 6:
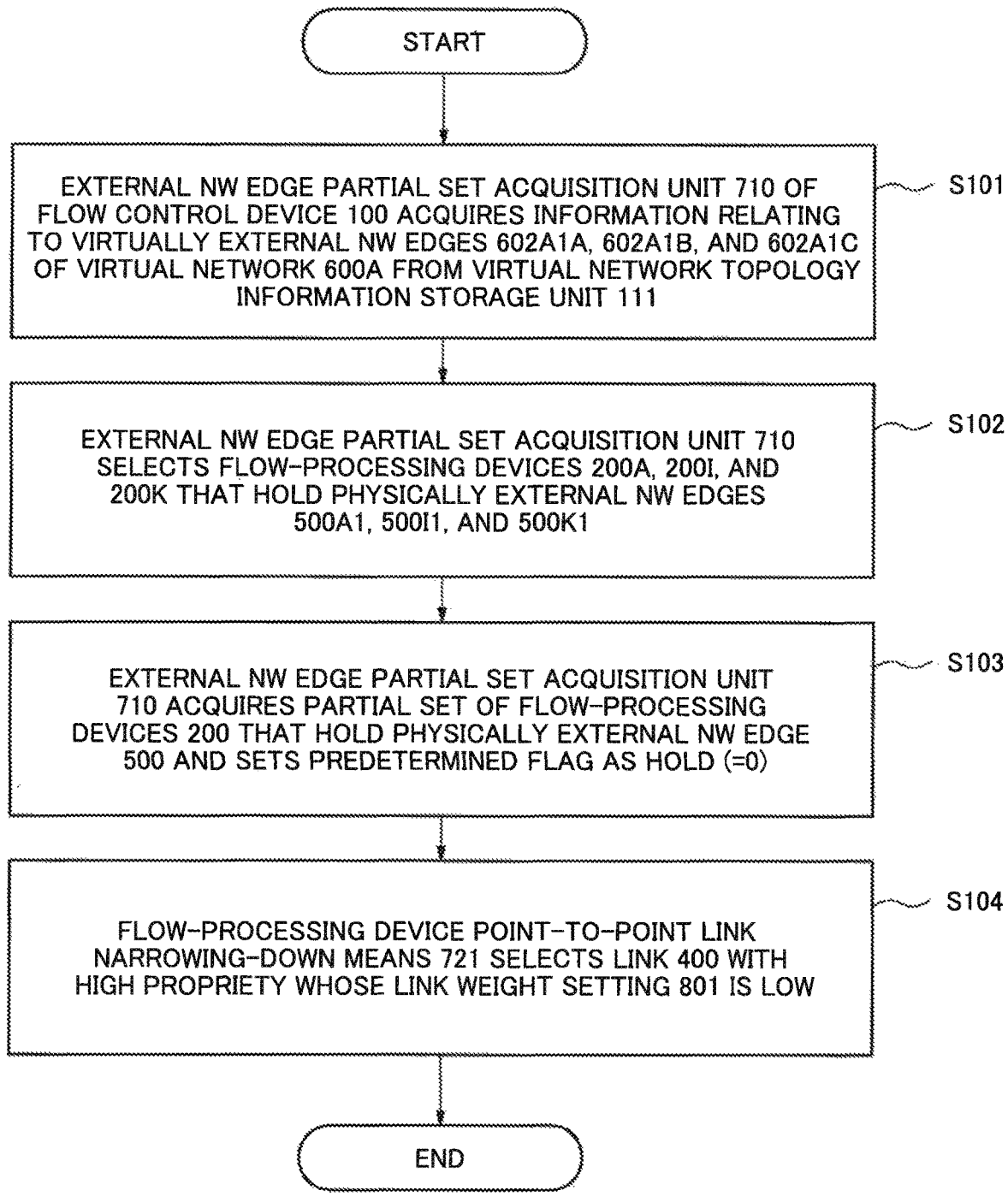
FIG. 6 is a flowchart illustrating an operation example of the flow control device 100 in the first example embodiment.

FIG. 6 is a flowchart illustrating an operation example of the flow control device 100 in the first example embodiment. In the following example, it is assumed that the link weight setting 801 of each of links 400 has the same value.

FIG. 6 is an operation example in which the flow control device 100 determines one of links having a minimum link weight setting 801 for connection between ports of adjacent flow-processing devices 200 by using the flow-processing device point-to-point link narrowing-down means 721, and excludes other links from path selection candidates.

The external NW edge partial set acquisition unit 710 of the flow control device 100 acquires information relating to the virtually external NW edges 602A1A, 602A1B, and 602A1C of the virtual network 600A from the virtual network topology information storage unit 111 (S101).

The external NW edge partial set acquisition unit 710 refers to the virtual network real network mapping information storage unit 110, and selects flow-processing devices 200A, 200I, and 200K that hold physically external NW edges 500A1, 50011, and 500K1 mapped to the virtually external NW edges 602A1A, 602A1B, and 602A1C, respectively (S102).

The external NW edge partial set acquisition unit 710 acquires a partial set of the flow-processing devices 200 that hold the physically external NW edges 500, respectively, sets an external NW edge partial set hold flag 920 of corresponding flow-processing devices 200 as hold (=0), and sets an external NW edge partial set hold flow-processing device connection determination flag 804 of pieces of link information 800 relating to the flow-processing devices 200 as hold (=0) (S103).

In S103, the external NW edge partial set acquisition unit 710 does not include a flow-processing device 200D and core flow-processing devices 200B, 200C, 200E, 200F, 200G, 200H, 200J, and 200L that are not mapped to the virtual network 600A in the partial set, and leaves flags 920 and 804 relating to these flow-processing devices 200 being non-hold.

The flow-processing device point-to-point link narrowing-down means 721 selects, for a combination of the flow-processing device 200I and the flow-processing device 200L in which there are a plurality of links 400 among combinations of flow-processing devices 200, one link with high priority whose link weight setting 801 is low from a link 400IJ1 and a link 400IJ2 (S104). When values for the link weight settings 801 are equivalent, the flow-processing device point-to-point link narrowing-down means 721 selects the link 400IJ1 by using a random number, leaves the point-to-point link use flag 802 for the link 400IJ1 being initial value "use", removes the link 400IJ2 from path candidates, and updates the point-to-point link use flag 802 for the link 400IJ2 as being "unused".

Figure 7:
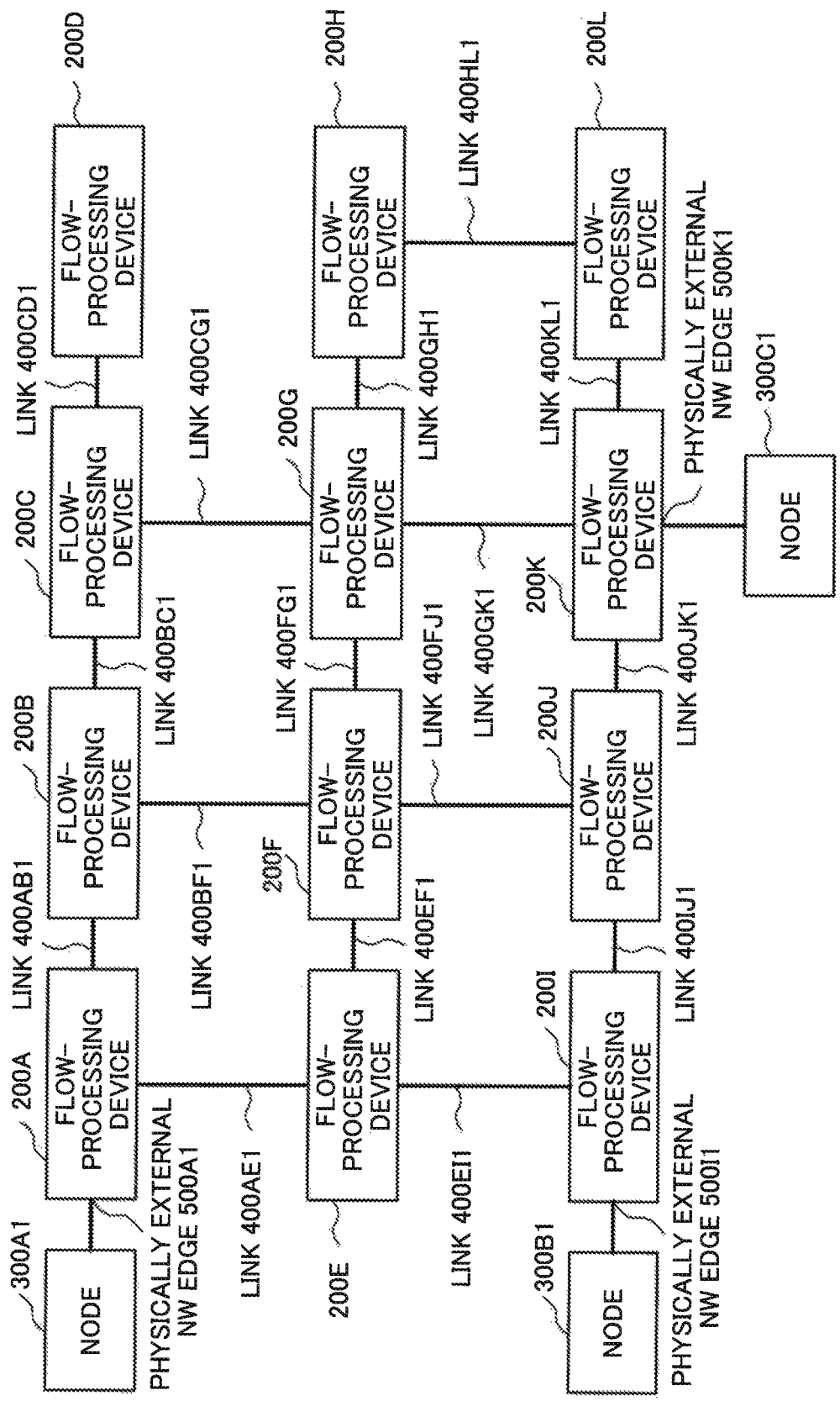
FIG. 7 is another configuration example of the communication system of the first example embodiment.

FIG. 7 is a diagram illustrating a configuration example of the communication system after the flow control device 100 executes the operation of FIG. 6. The flow control device 100 executes the operation of FIG. 6, and thereby the state of FIG. 7 is obtained. FIG. 7 illustrates the state obtained when the external NW edge partial set acquisition unit 710 acquires a partial set of physically external NW edges 500 relating to the virtual network 600A, and thereafter the flow-processing device point-to-point link narrowing-down means 721 selects one of a plurality of links 400 between two flow-processing devices.

Figure 8:
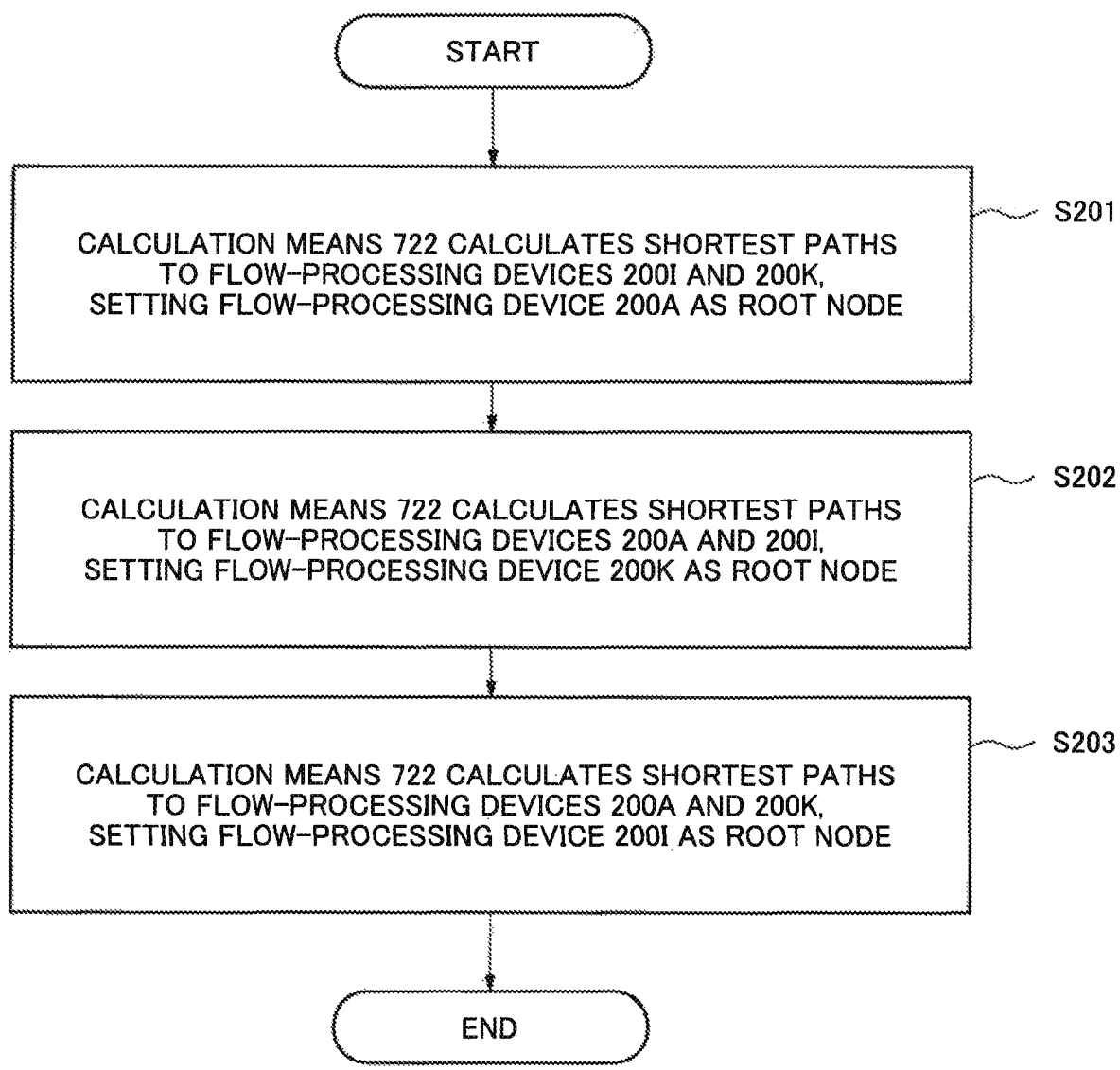
FIG. 8 is a flowchart illustrating another operation example of the flow control device 100 in the first example embodiment.

FIG. 8 is a flowchart illustrating another operation example of the flow control device 100 in the first example embodiment. FIG. 8 is a diagram illustrating an operation example of the flow control device 100 after the configuration example of FIG. 7 is obtained.

FIG. 8 is an operation example in which the flow control device 100 calculates, using the inter-physically external NW edge hold flow-processing devices shortest path equivalent cost multipath calculation means 722, an equivalent cost multipath being a shortest path for each of all combinations of two flow-processing devices 200 holding physically external NW edges 500, respectively, calculates a shortest path selection count 803 with respect to each of links 400 between flow-processing devices 200 selected for the shortest path, and excludes a link 400 for which the shortest path selection count 803 is left being an initial value 0 from path selection candidates.

The calculation means 722 of the flow control device 100, setting the flow-processing device 200A as a root node, calculates shortest paths being equivalent cost multipaths to the flow-processing devices 200I and 200K, respectively, by using a Dijkstra's algorithm (S201). The calculation means 722 selects, for example, links 400 as an equivalent cost multipath with a cost "a value of the link weight setting 801×4 (the number of passed links)" from the flow-processing device 200A to the flow-processing device 200K, since a value of the link weight setting 801 of each link is the same.

Figure 9:
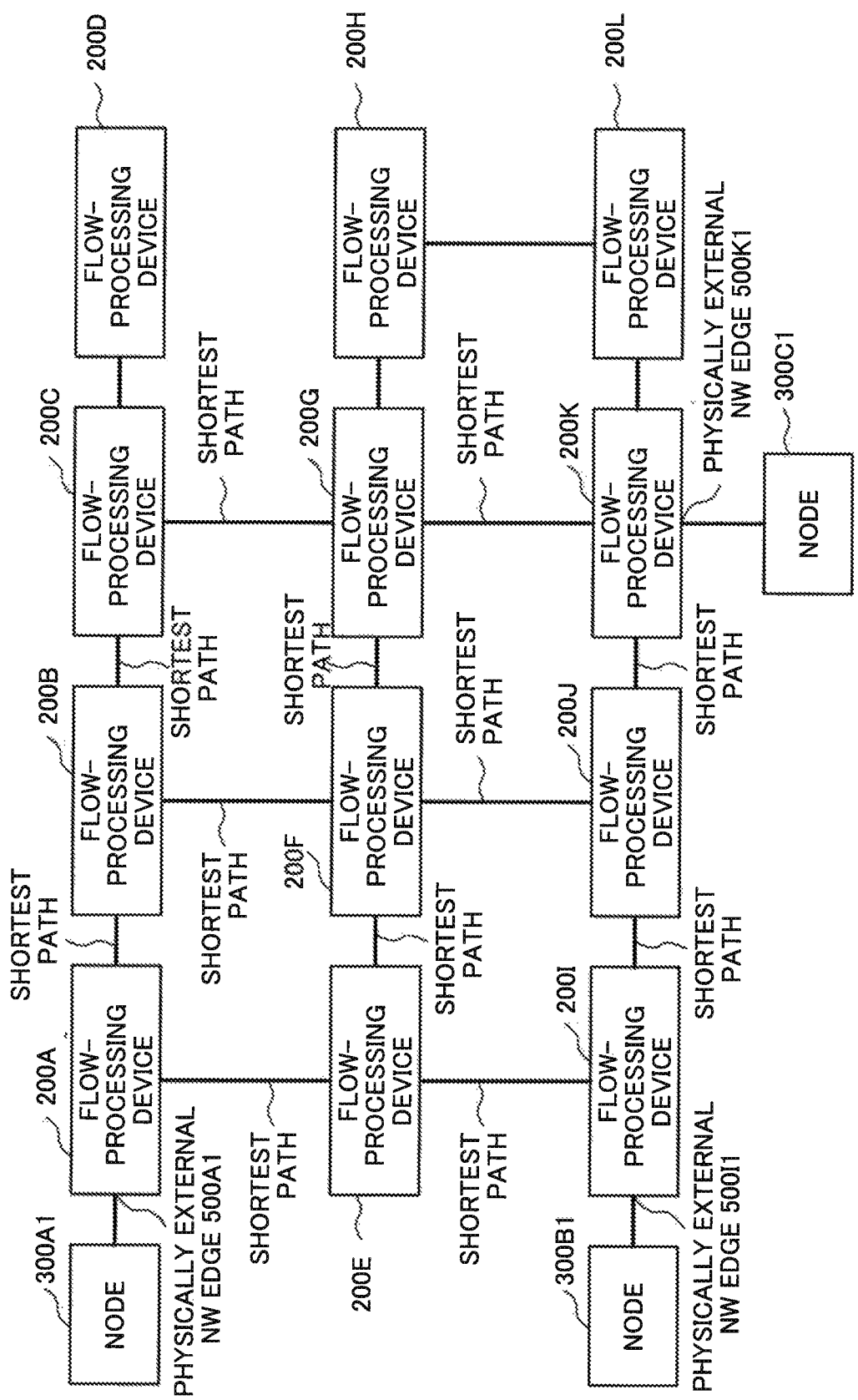
FIG. 9 is another configuration example of the communication system in the first example embodiment.

FIG. 9 is a diagram illustrating a configuration example of the communication system after the calculation means 722 of the flow control device 100 executes S201 of FIG. 8. FIG. 9 illustrates links 400 selected for shortest paths to another physically external NW edge 500I1 and another physically external NW edge 500K1 in the case the physically external NW edge 500A1 is a root node. Also in the case that the physically external NW edge 500K1 is a root node, similar link 400s are selected for shortest paths.

The calculation means 722 selects links 400 indicated by a "shortest path" in FIG. 9 as a path from the flow-processing device 200A to the flow-processing device 200K. Further, as illustrated in FIG. 9, while a shortest path from the flow-processing device 200A to the flow-processing device 200I is a path passing through the flow-processing devices 200A, 200E, and 200I, the path is included in the shortest path from the flow-processing device 200A to the flow-processing device 200K. The shortest path selection counts 803 of the link 400s indicated by the "shortest path" in FIG. 9 are updated from an initial value of 0 times to 1 time.

The calculation means 722 similarly, setting the flow-processing device 200K as a root node, calculates shortest paths being equivalent cost multipaths to the flow-processing devices 200A and 200I, respectively (S202). The calculation means 722 selects the links 400 indicated by the "shortest path" in FIG. 9 as shortest paths calculated in S202. The shortest path selection counts 803 of the links 400 indicated by the "shortest path" in FIG. 9 are updated to 2 times.

The calculation means 722 similarly, setting the flow-processing device 200I as a root node, calculates shortest paths being equivalent cost multipaths to the flow-processing devices 200A and 200K, respectively (S203).

Figure 10:
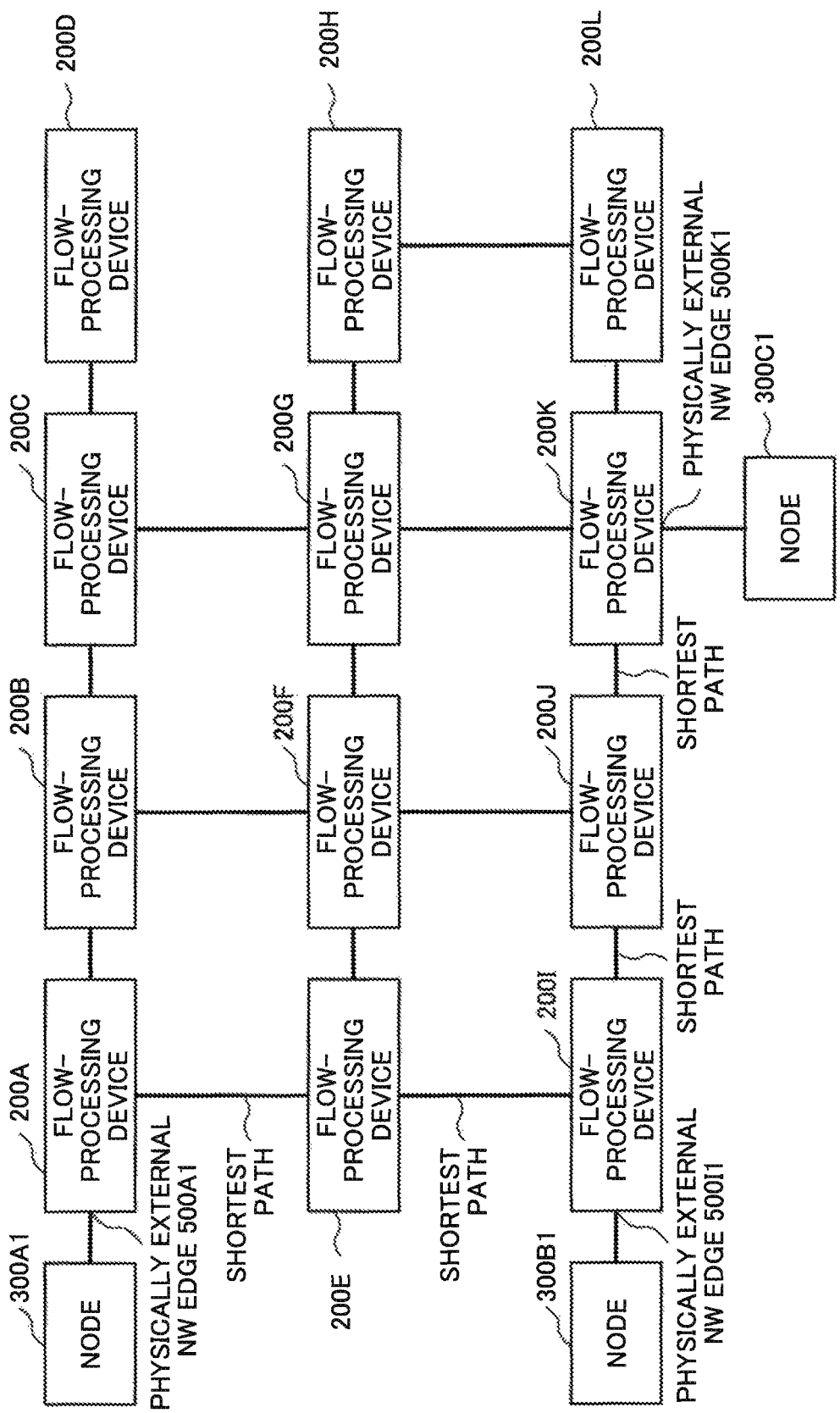
FIG. 10 is another configuration example of the communication system in the first example embodiment.

FIG. 10 is a diagram illustrating a configuration example of the communication system after the calculation means 722 of the flow control device 100 executes S203 of FIG. 8. FIG. 10 illustrates links 400 selected for shortest paths to another physically external NW edge 500A1 and another physically external NW edge 500K1 in the case the physically external NW edge 500I1 is a root node.

The calculation means 722 selects links 400 indicated by a "shortest path" in FIG. 10 as calculated shortest paths.

Figure 11:
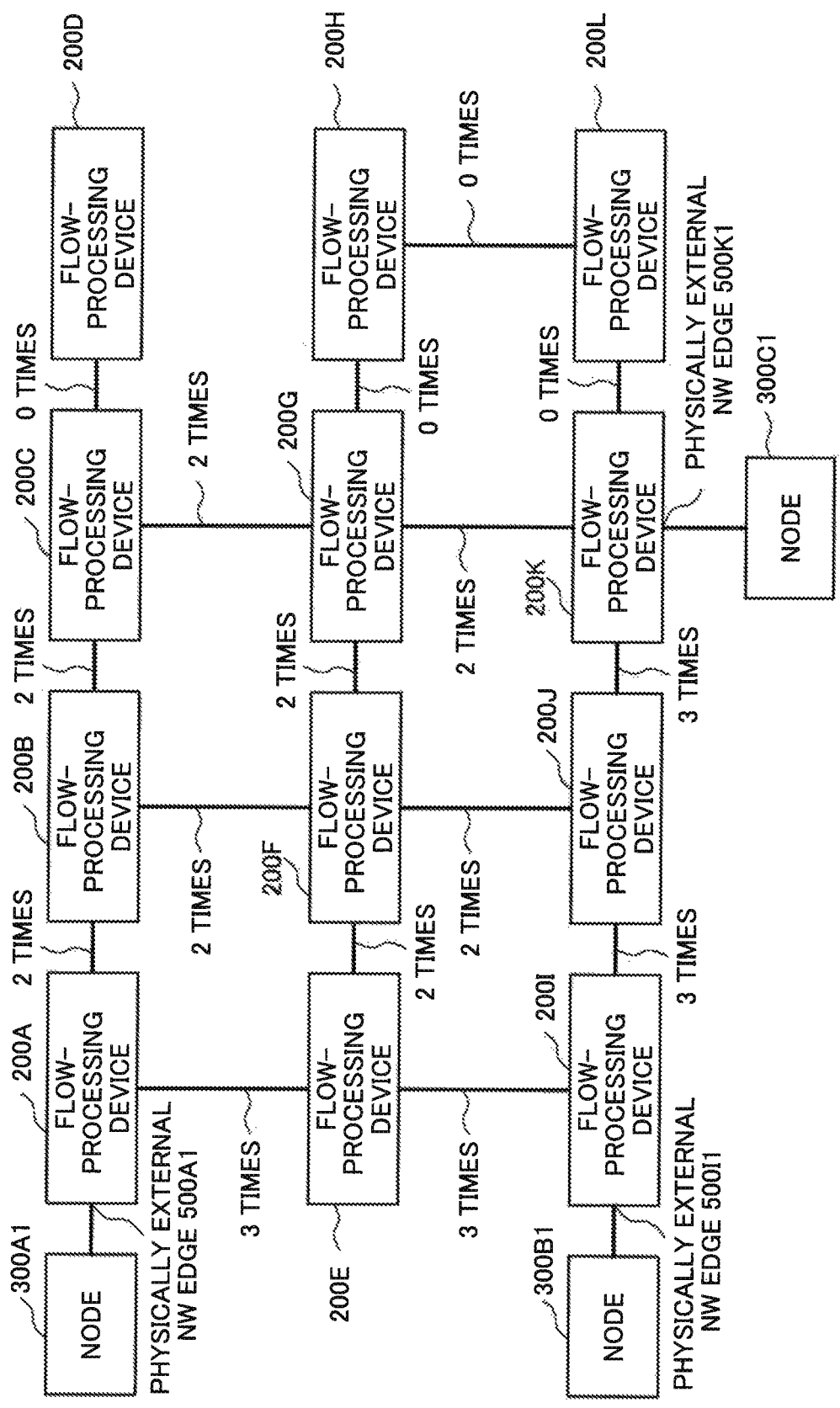
FIG. 11 is another configuration example of the communication system in the first example embodiment.

FIG. 11 is a diagram illustrating a configuration example of the communication system in the case the flow control device 100 executes S203 of FIG. 8 and increments the shortest path selection counts 803 of links 400 selected for a shortest path. FIG. 11 indicates the shortest path selection counts 803 set by the inter-physically external NW edge hold flow-processing devices shortest path equivalent cost multipath calculation means 722 based on the links 400 selected for shortest paths in the case the physically external NW edges 500A1, 500 I1, and 500 K1 in FIG. 9 and FIG. 10 are root nodes.

The calculation means 722 determines a non-selection link for a delivery range limited spanning minimum tree 740 that is a link whose shortest path selection count 803 is an initial value of 0 times, as a link to be excluded from target links for spanning minimum tree calculation.

Figure 12:
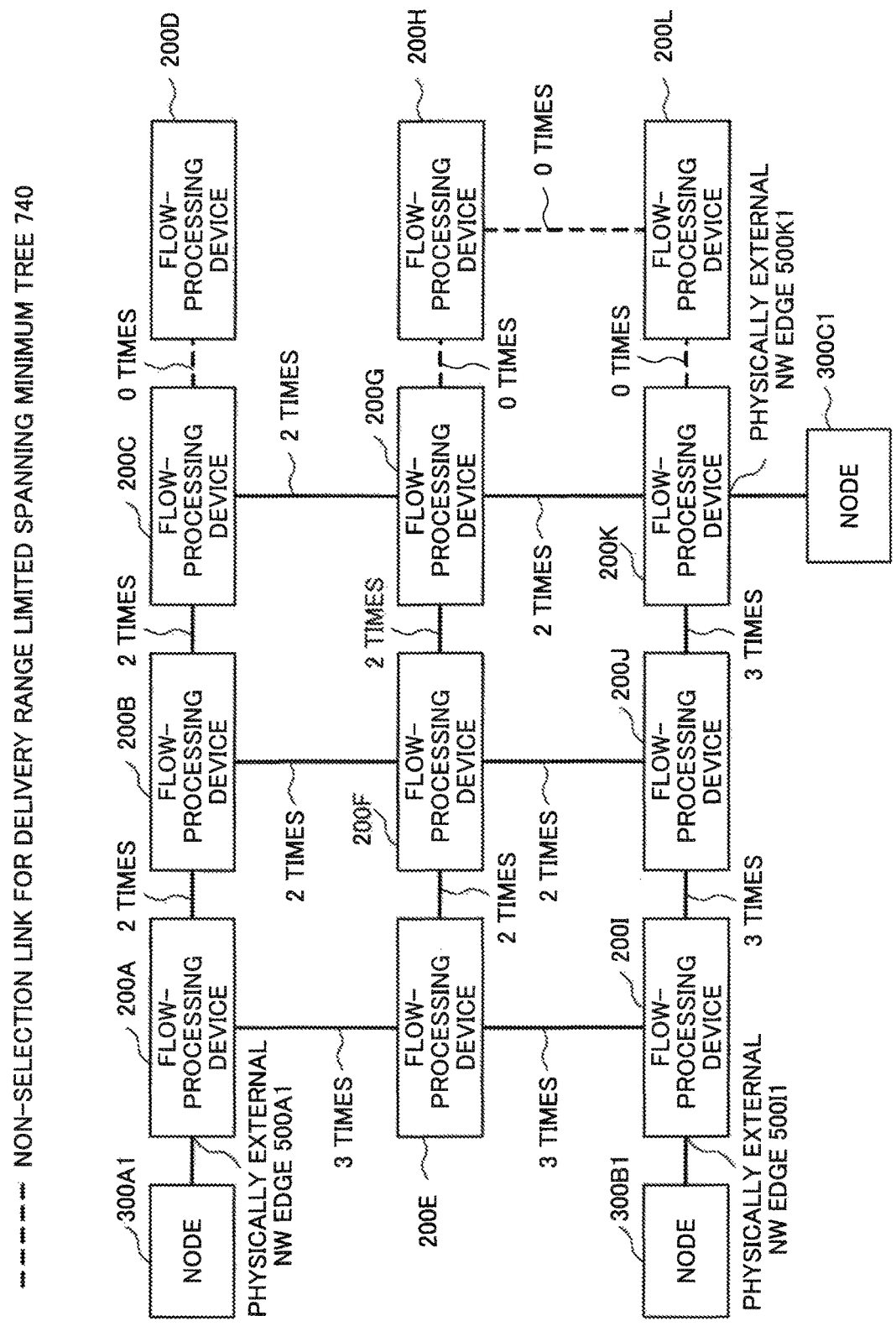
FIG. 12 is another configuration example of the communication system in the first example embodiment.

FIG. 12 is another configuration example of the communication system on which the non-selection links for the delivery range limited spanning minimum tree 740 which are determined as the links to be excluded from target links for spanning minimum tree calculation by the calculation means 722 are illustrated. FIG. 12 illustrates a state where links 400, whose shortest path selection count 803 is an initial value of 0 since they have not been selected for a shortest path, are excluded from calculation target links.

As in FIG. 12, the calculation means 722 determines the non-selection links for the delivery range limited spanning minimum tree 740 (the links indicated by a dashed line in FIG. 12) as links to be excluded from target links for spanning minimum tree calculation. The calculation means 722 calculates a shortest path being an equivalent cost multipath by setting each of all edge flow-processing devices 200 that hold a physically external edge 500 as a root node, and obtains a shortest path selection count 803 for each of links 400. The calculation means 722 determines non-selection links for the delivery range limited spanning minimum tree 740, whose shortest path selection count 803 is an initial value of 0 times, as links to be excluded from target links for spanning minimum tree calculation.

Figure 13:
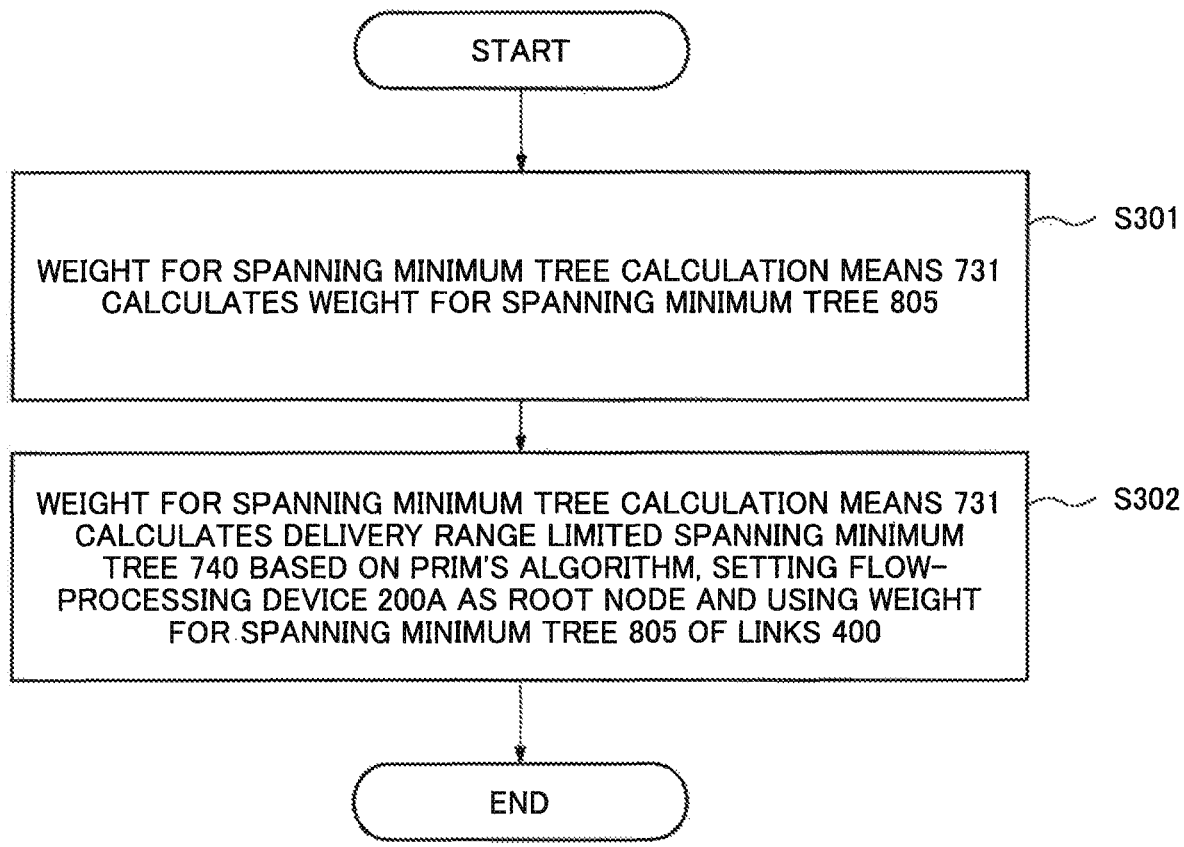
FIG. 13 is a flowchart illustrating another operation example of the flow control device 100 in the first example embodiment.

FIG. 13 is a flowchart illustrating another operation example of the flow control device 100 in the first example embodiment. FIG. 13 is a diagram illustrating an operation example of the flow control device 100 after the configuration example of FIG. 12 is obtained.

FIG. 13 is an operation example in which the flow control device 100 determines a weight for spanning minimum tree 805 for links 400 based on a predetermined priority using a result of the processing of FIG. 8, and calculates a delivery range limited spanning minimum tree 740.

The predetermined priority is defined as "a link weight setting 801 of a link>a shortest path selection count 803 of the link>an external NW edge partial set hold flow-processing device connection determination flag 804 of the link". Note that the link weight setting 801 is a value determined by a line speed of a port of the flow-processing device connected to the link 400 or by user setting. In this manner, the flow control device 100 calculates a weight for spanning minimum tree 805, preferentially reflecting a value of the link weight setting 801 compared with values of the external NW edge partial set hold flow-processing device connection determination flag 804 of the link and a shortest path selection count 803 of the link based on a result of multiplying the link weight setting 801 by a sufficiently large value.

In this manner, the shortest path selection count 803 of a link is reflected in the weight for spanning minimum tree 805, and thereby among all shortest paths, a commonly used link is selected more for a path of the delivery range limited spanning minimum tree 740. By selecting commonly used links 400 for the path, it is possible to reduce the number of links 400 selected unnecessarily for the delivery range limited spanning minimum tree 740 and realize bandwidth reduction.

Further, the external NW edge partial set hold flow-processing device connection determination flag 804 is a flag indicating whether a flow-processing device 200 connected with a link 400 holds an external NW edge. When, for example, a shortest path is obtained by passing through any one of a flow-processing device 200 that holds a physically external edge 500 and a flow-processing device 200 that does not hold a physically external edge 500, since shortest path selection counts 803 have the same value due to a topology having high symmetry, the path passing through the flow-processing device 200 that holds a physically external edge 500 is selected by reflecting the external NW edge partial set hold flow-processing device connection determination flag 804 to a weight for spanning minimum tree 805. Thereby, the flow-processing device 200 that does not hold a physically external edge 500 is disposed more in a leaf of a delivery range limited spanning minimum tree 740.

The weight for spanning minimum tree calculation means 731 of the flow control device 100 calculates a weight for spanning minimum tree 805 (S301). Specifically, the weight for spanning minimum tree calculation means 731 calculates "a 32 bit-shift value of a link weight setting 801+a 16 bit-shift value of (the number of flow-processing devices 200 each hold an external NW edge included in an external NW edge partial set–a shortest path selection count 803)+a 8 bit-shift value of an external NW edge partial set hold flow-processing device connection determination flag 804". Depending on the number of hops between flow-processing devices, many values with low reflection propriety may be summed. Therefore, shift numbers need to be adjusted depending on the number of flow-processing devices 200 in such a way that a summed weight for low reflection propriety is not larger than a summed weight for high reflection propriety.

Such a case is described below with an example of a small shift number. It is assumed that a 4-bit shift value of a link weight setting 801 (the same value of 1 for all links), a 2 bit-shift value of (the number of flow-processing devices 200 each hold an external NW edge included in an external NW edge partial set–a shortest path selection count 803) (the same value of 2 for all links), and a non-shift value of an external NW edge partial set hold flow-processing device connection determination flag 804 are added. In this case, a weight for calculating a delivery range limited spanning minimum tree 740 is obtained, from (10000$b$ (binary digit)+(1000$b$ (binary digit)+("1" for hold with respect to an external NW edge partial set or "0" for non-hold)), as a weight value 25 (hold with respect to the external NW edge partial set) or a weight value 24 (non-hold). In the case there are 200 hops between flow-processing devices 200, a total of the weights is "24×200=4800". The value of the link weight setting 801 (10000b (binary digit)=16 (decimal digit)" is smaller than 4800. Therefore, the value of the link weight setting 801 may not be sufficiently reflected to a calculation result of the delivery range limited spanning minimum tree 740.

The weight for spanning minimum tree calculation means 731 calculates, setting the flow-processing device 200A as a root node and using weights for spanning minimum tree 805 of links 400, a delivery range limited spanning minimum tree 740 based on a Prim's algorithm (S302). In this case, the weight for spanning minimum tree calculation means 731 stores also a path from each flow-processing device 200 to the root node in the delivery range limited spanning minimum tree 740.

Figure 14:
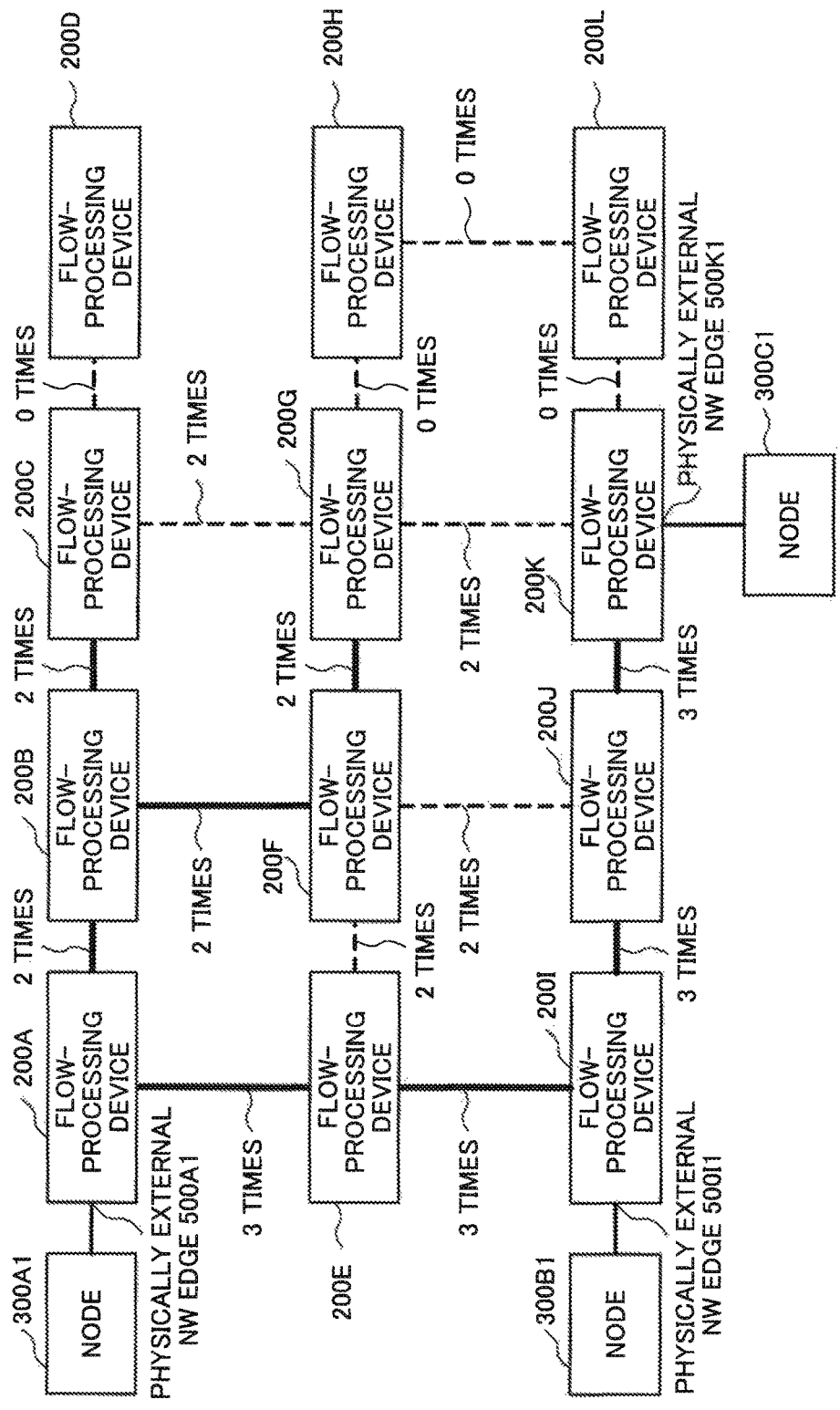
FIG. 14 is another configuration example of the communication system in the first example embodiment.

FIG. 14 is a diagram illustrating a configuration example of the communication system obtained after the weight for spanning minimum tree calculation means 731 of the flow control device 100 executes S302 of FIG. 13. FIG. 14 illustrates a delivery range limited spanning minimum tree 740 calculated by the spanning minimum tree calculation means 732.

Figure 15:
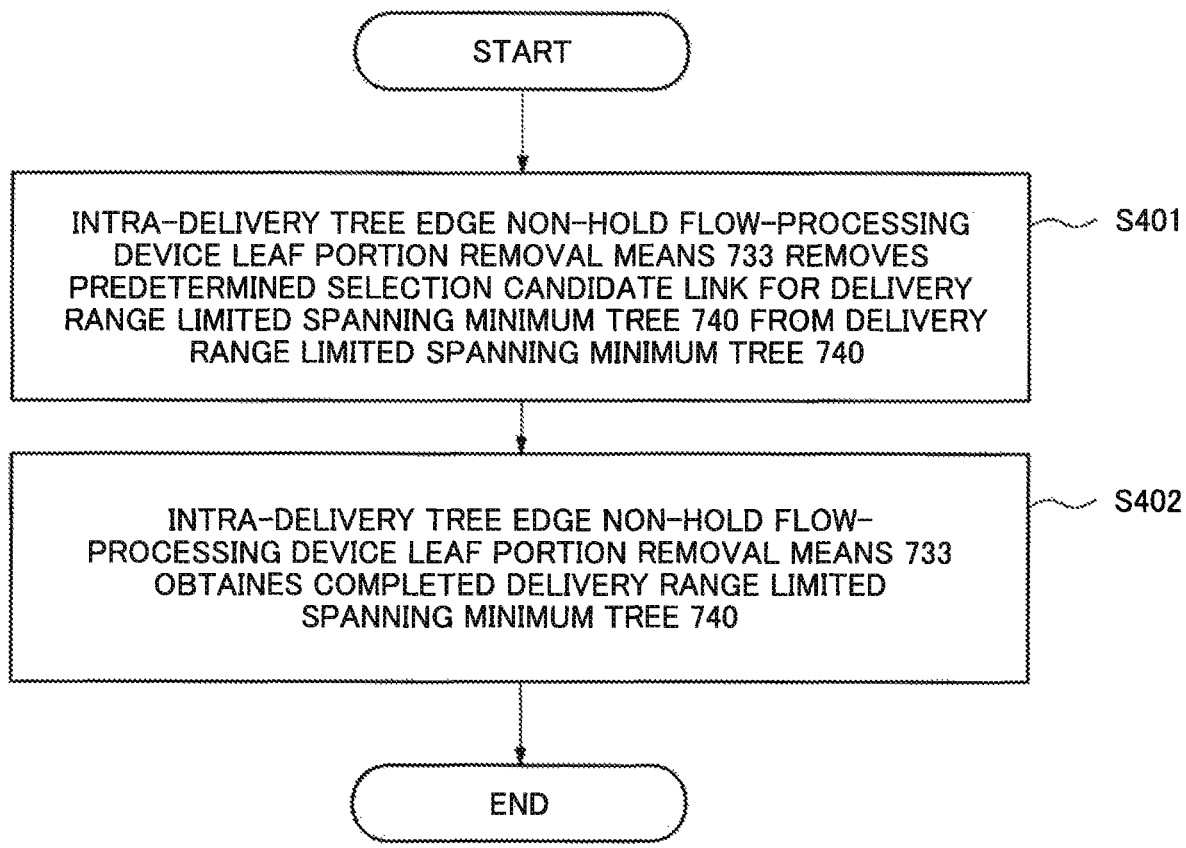
FIG. 15 is a flowchart illustrating another operation example of the flow control device 100 in the first example embodiment.

FIG. 15 is a flowchart illustrating another operation example of the flow control device 100 in the first example embodiment. FIG. 15 is a diagram illustrating an operation example of the flow control device 100 after the configuration example of FIG. 14 is obtained.

FIG. 15 illustrates an operation example in which the flow control device 100 removes a portion where a flow-processing device 200 that does not hold a physically external NW edge 500 is located as a leaf, from the delivery range limited spanning minimum tree 740 calculated in the operation of FIG. 13. Since there is a core flow-processing device 200 that is not passed during communication between physically external NW edges 500 on the delivery range limited spanning minimum tree 740, it is necessary to remove the core flow-processing device 200. It is performed by setting one flow-processing device 200 that holds a physically external NW edges 500 as a root node on the delivery range limited spanning minimum tree 740, tracking links 400 from another flow-processing device 200 that holds another physically external NW edges 500 to the root node, and removing a link has not been tracked from the delivery range limited spanning minimum tree 740 after tracking from all other physically external NW edges 500 to the root node.

The intra-delivery tree edge non-hold flow-processing device leaf portion removal means 733 of the flow control device 100 removes a selection candidate link for the delivery range limited spanning minimum tree 740 which is not in paths from the flow-processing devices 200I and 200K holding each physically external NW edge 500 to the flow-processing device 200A being is a root node from the delivery range limited spanning minimum tree 740 (S401). As a result, the intra-delivery tree edge non-hold flow-processing device leaf portion removal means 733 obtains the completed delivery range limited spanning minimum tree 740 (S402).

Figure 16:
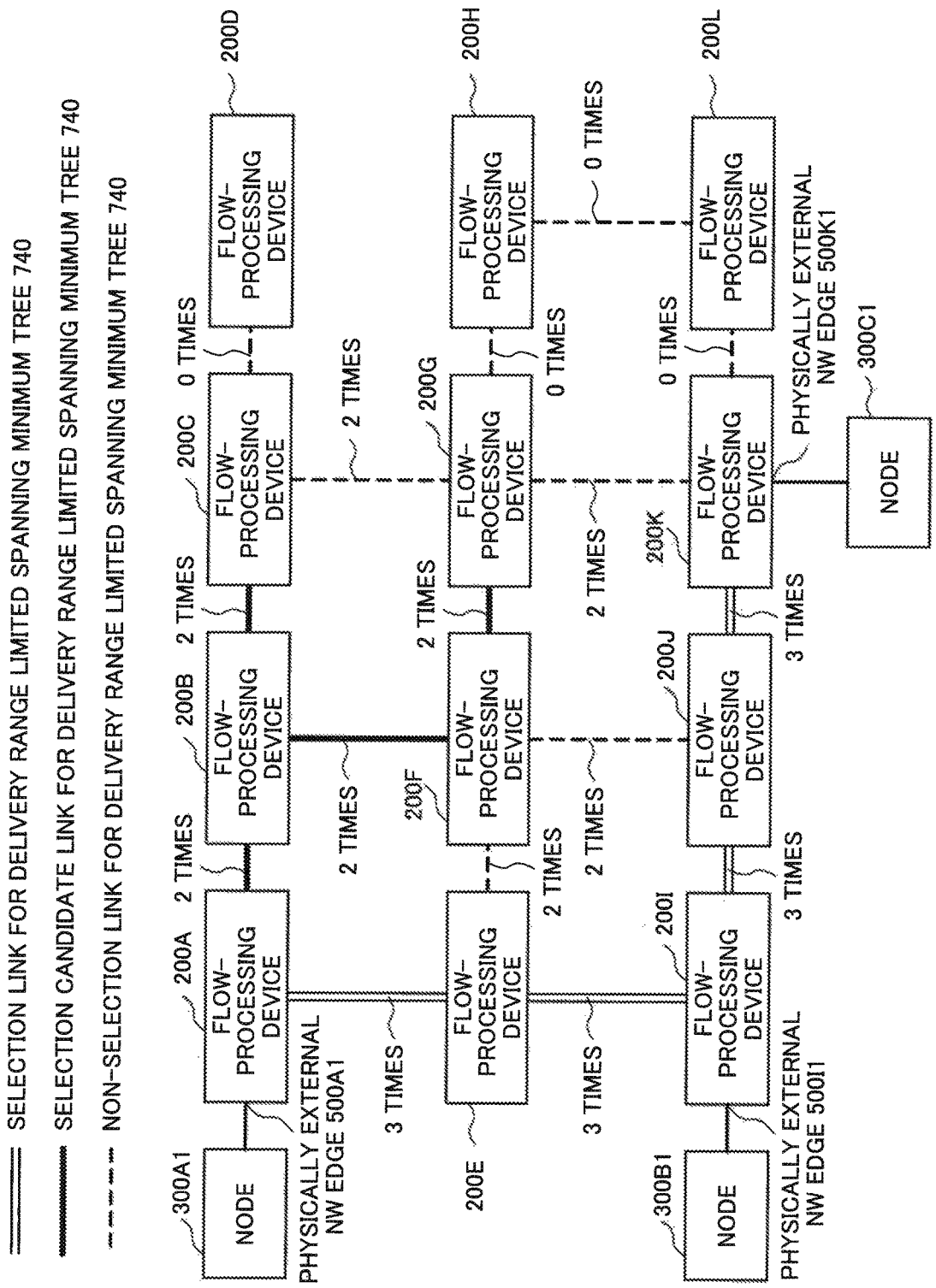
FIG. 16 is another configuration example of the communication system in the first example embodiment.

FIG. 16 is a diagram illustrating a configuration example of the communication system obtained after the intra-delivery tree edge non-hold flow-processing device leaf portion removal means 733 of the flow control device 100 executes S401 of FIG. 15. FIG. 16 illustrates links 400 that are not used for a shortest path between physically external NW edges 500 in the calculated delivery range limited spanning minimum tree 740.

Figure 17:
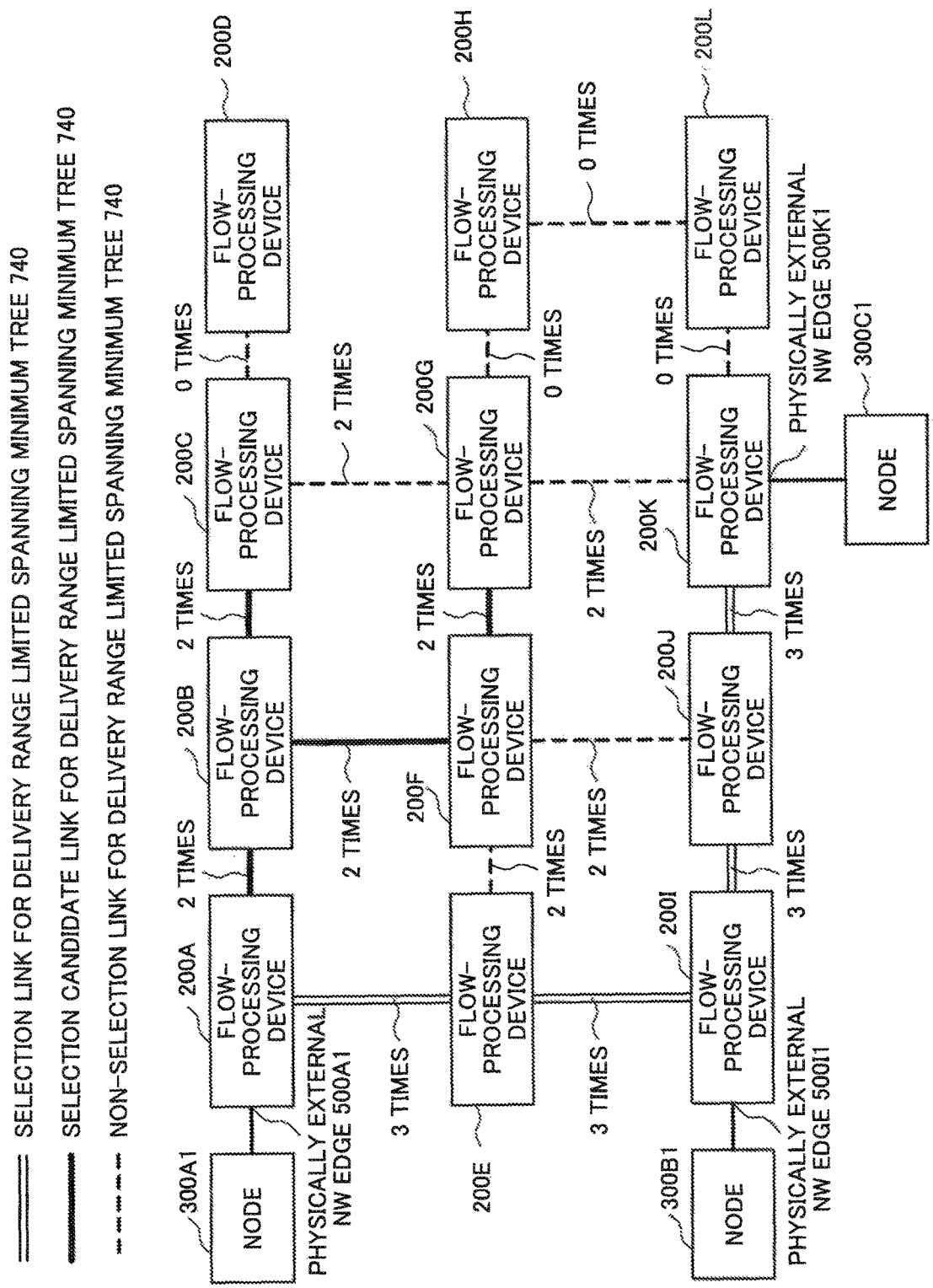
FIG. 17 is another configuration example of the communication system in the first example embodiment.

FIG. 17 is a diagram illustrating a configuration example of the communication system obtained after the intra-delivery tree edge non-hold flow-processing device leaf portion removal means 733 of the flow control device 100 executes S402 of FIG. 15. FIG. 17 illustrates a final delivery range limited spanning minimum tree 740 in which links 400 that are not used for the shortest path are excluded.

Note that, as a method for determining a partial set of edges connected to an external network, a partial set of physically external NW edges 500 may be directly specified by the user or may be determined using a protocol such as IGMP/MLD for managing an IP multicast group receiver. The flow control device 100 can calculate, by preparing data for each of virtual networks 600, trees for a plurality of external NW edge partial sets.

As described above, the flow control device 100 in the first example embodiment calculates a delivery tree passing through a minimum necessary number of flow-processing devices 200 for a set of physically external NW edges 500 mapped to virtually external NW edges 602 for the virtual network 600A (i.e. a partial set of physically external NW edges 500 for multipoint-to-multipoint communication).

The flow control device 100 in the first example embodiment calculates a spanning minimum tree reflecting the shortest path selection count 803 in a weight for spanning minimum tree 805 as exemplified in the delivery range limited spanning minimum tree 740 illustrated in FIG. 17, and therefore there is an advantageous effect of reducing flow-processing devices 200 included in delivery range.

Figure 18:
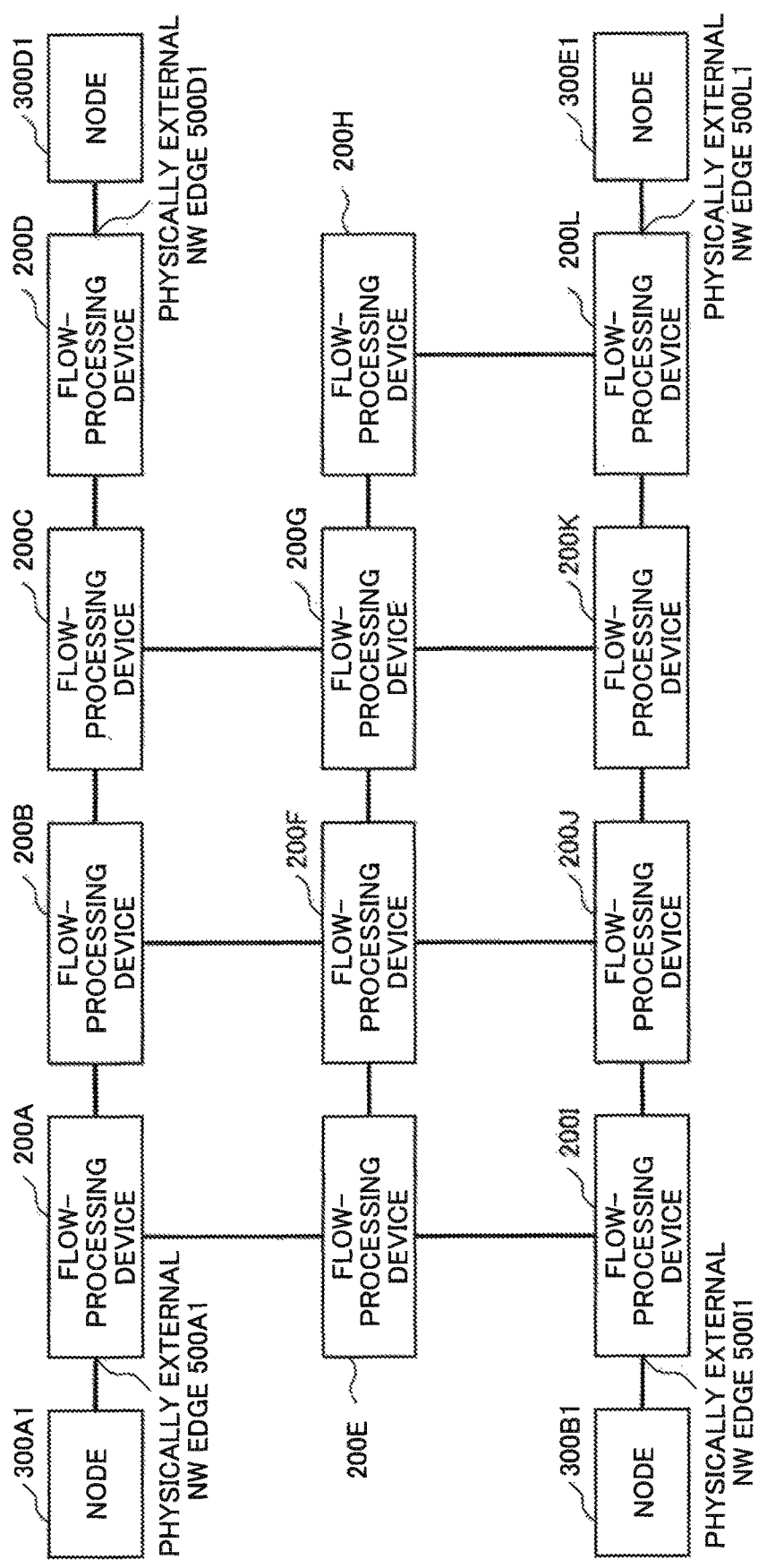
FIG. 18 is another configuration example of the communication system in the first example embodiment.

FIG. 18 is an example of a high symmetry topology in which flow-processing devices 200 that do not hold a physically external NW edge 500 are selected for a shortest path between physically external NW edges 500, since the shortest path selection counts 803 have the same value. It is assumed that link weight settings 801 for respective links 400 have the same value. The flow control device 100 in the first example embodiment can calculate a delivery tree passing through minimum necessary flow-processing devices 200, even for the high symmetry topology as exemplarily illustrated in FIG. 18.

Figure 19:
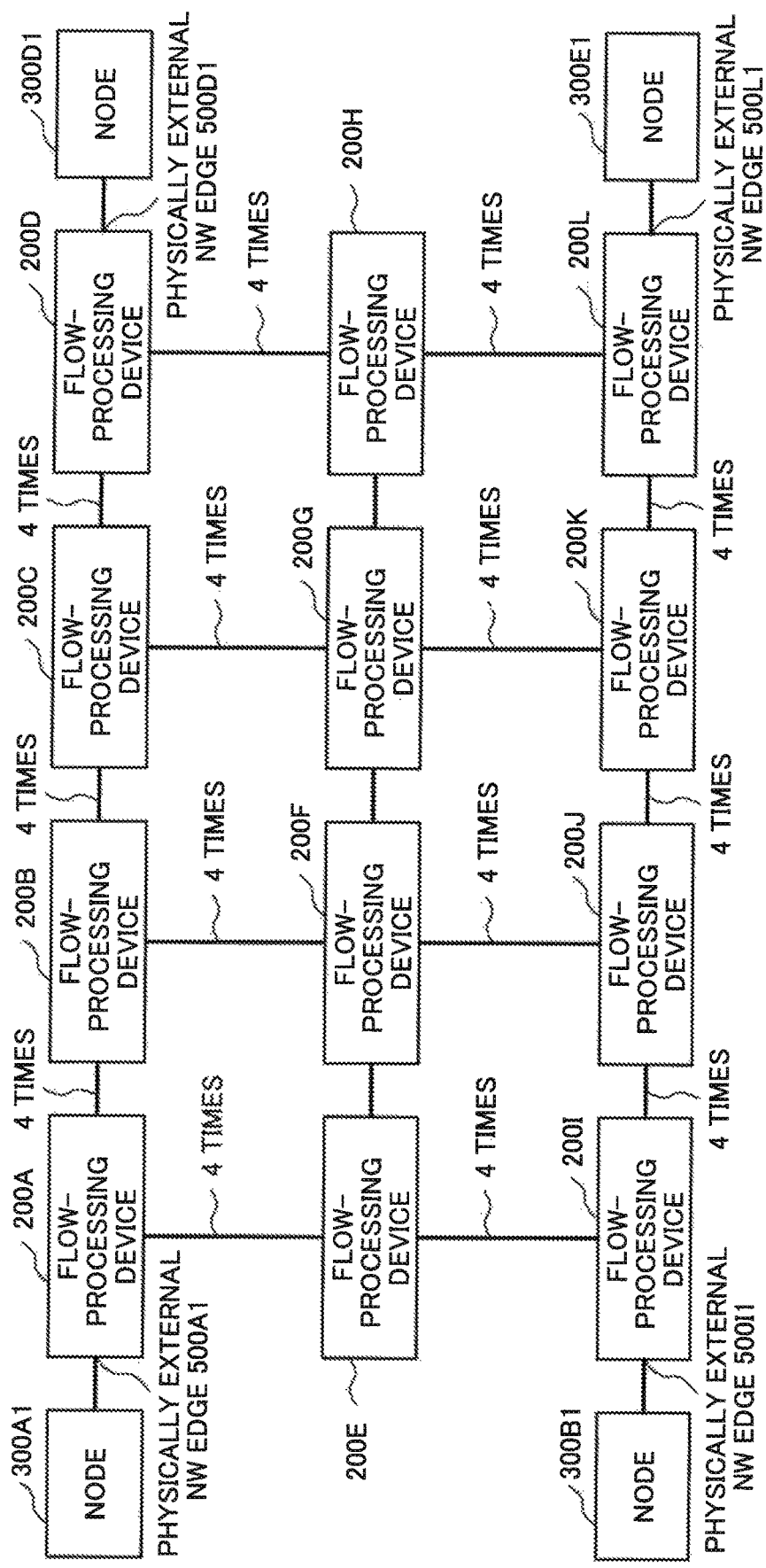
FIG. 19 is another configuration example of the communication system in the first example embodiment.
Figure 20:
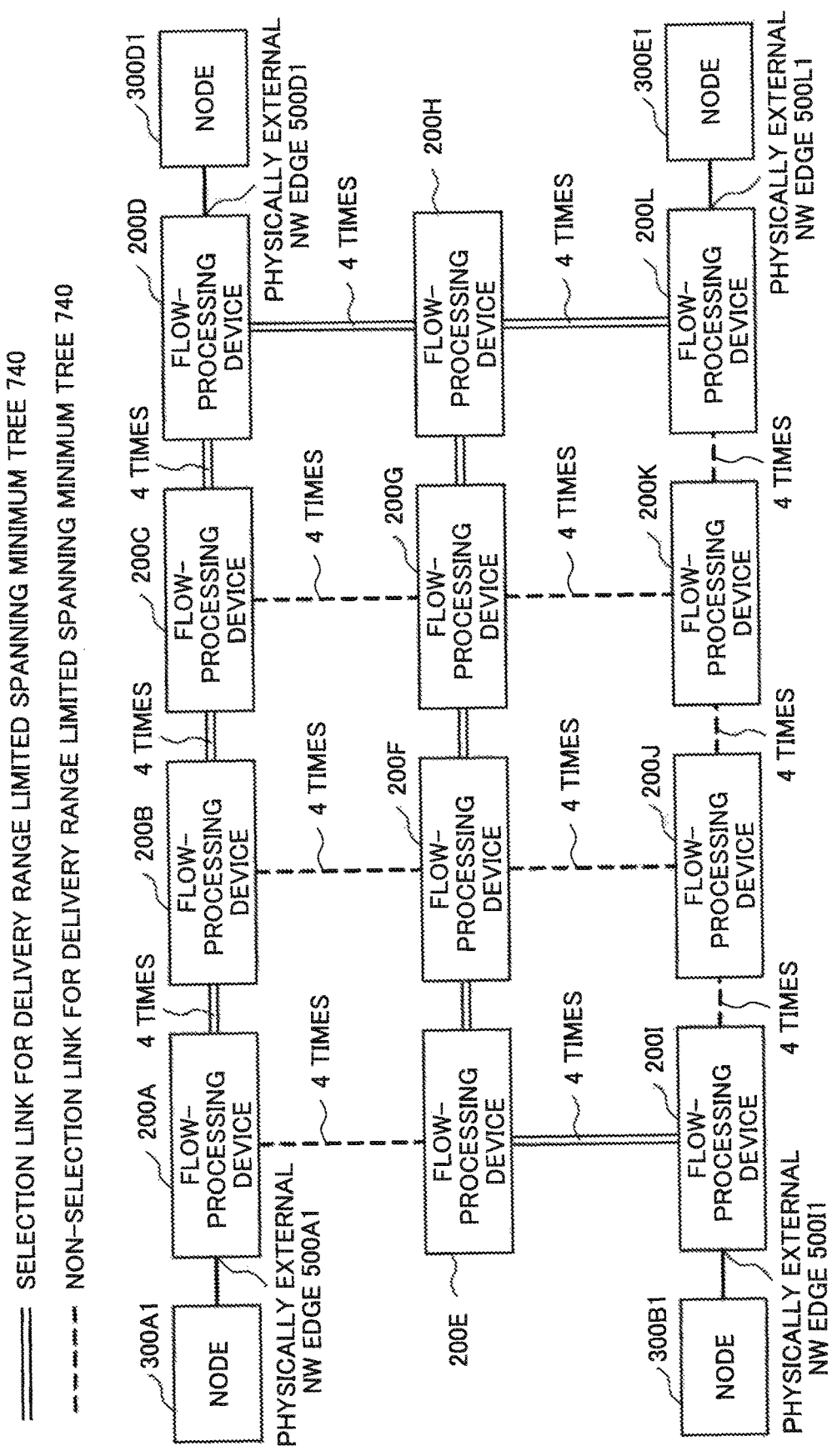
FIG. 20 is another configuration example of the communication system in the first example embodiment.
Figure 21:
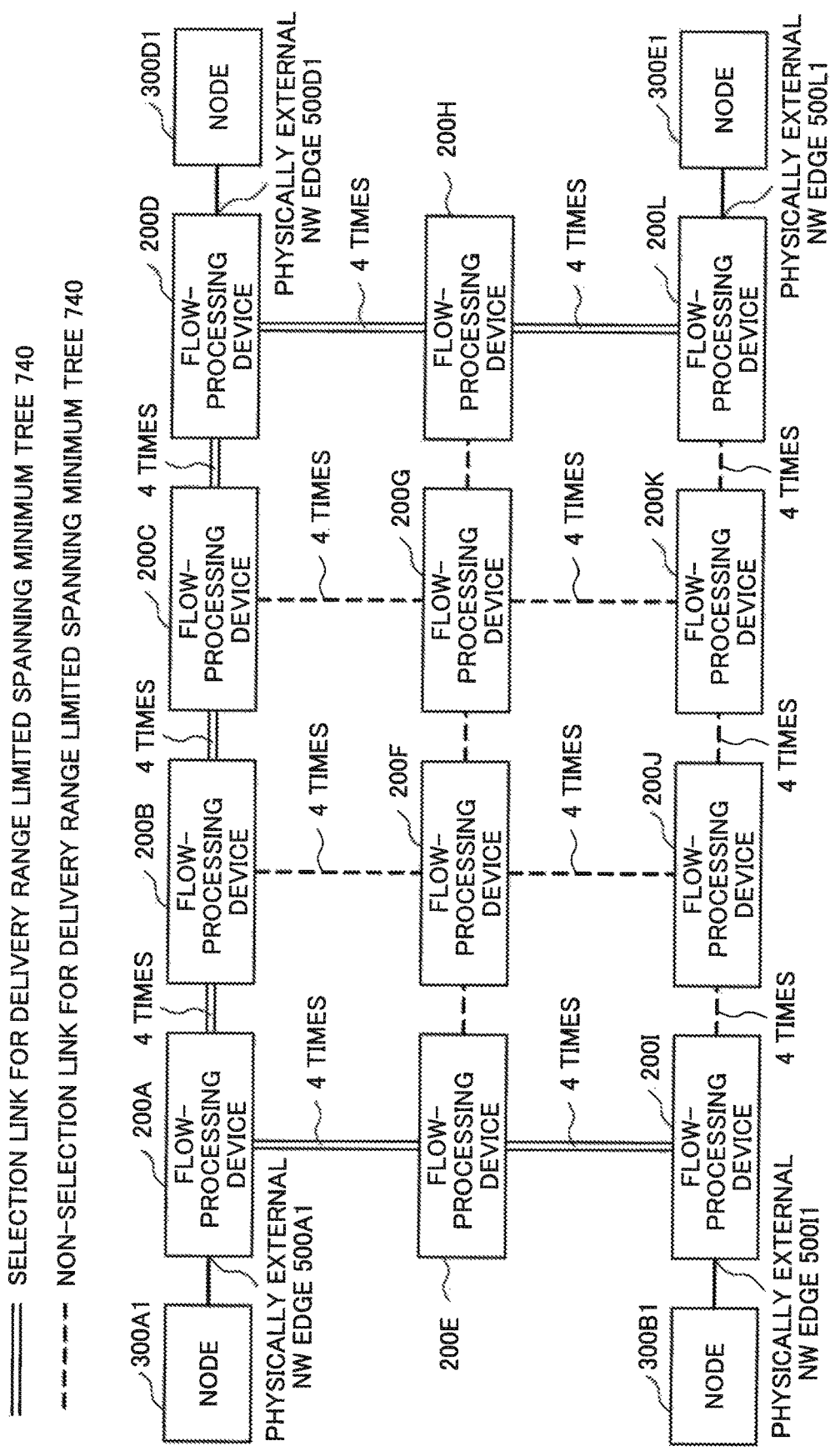
FIG. 21 is another configuration example of the communication system in the first example embodiment.

Further, the flow control device 100 in the first example embodiment uses an external NW edge partial set hold flow-processing device connection determination flag 804 and thereby can select optimum links 400. For example, it is assumed that, in a network configuration having high symmetry as exemplarily illustrated in FIG. 18, a shortest path is obtained, setting each edge flow-processing device 200 holding a physically external NW edge 500 as a root node. In this case, by calculating a shortest path being equivalent cost multipath from the root node to an edge flow-processing device 200 on a diagonal line, all links 400 are selected for the shortest path. The flow control device 100 calculates the shortest path selection count 803, setting each of edge flow-processing devices 200 disposed at four corners as a root node, and then obtains "4 times" for all links as exemplarily illustrated in FIG. 19. Therefore, when the flow control device 100 does not reflect an external NW edge partial set hold flow-processing device connection determination flag 804 to a weight for spanning minimum tree 805, core flow-processing devices 200 are unnecessarily included in a shortest path between edge flow-processing devices 200 in a result of the Prim's algorithm. However, when the flow control device 100 of the first example embodiment reflects the external NW edge partial set hold flow-processing device connection determination flag 804 to the weight for spanning minimum tree 805, costs of links 400 connected to an edge flow-processing device 200 that holds a physically external NW edge 500 are decreased and the links 400 are preferentially selected. Therefore, a delivery range limited spanning minimum tree 740 as in FIG. 21 is calculated. As a result, the flow control device 100 can select optimum links 400. As a more specific advantageous effect of the external NW edge partial set hold flow-processing device connection determination flag 804, when any one of links 400 between edge flow-processing devices 200 and between core flow-processing devices 200 is to be selected, the flow control device 100 selects the link 400 between edge flow-processing devices 200. FIG. 20 illustrates a delivery range limited spanning minimum tree 740 in the case flow-processing devices 200 that do not hold a physically external NW edge 500 and are unnecessary for a shortest path between physically external NW edges 500 are selected. On the other hand, FIG. 21 illustrates a delivery range limited spanning minimum tree 740 in the case flow-processing device 200 that do not hold a physically external NW edge 500 and are unnecessary for a shortest path between physically external NW edges 500 are not selected.

Further, the flow control device 100 can also reduce a calculation amount.

In a graph theory, as a method for calculating a tree including all vertexes in a partial set of vertexes, a Steiner tree is known. It is known that a problem of determining a minimum Steiner tree in a weighted graph is NP-hard and it is very difficult to determine an optimum solution. It is known that a calculation amount for determining a minimum Steiner tree is $O((v3^\tau)+v^2 \times 2^\tau + v^3)$ with respect to the number of elements v in a set of vertexes and the number of elements $\tau$ in a partial set of vertexes, and with an increase in the number of elements, a calculation amount is explosively increased.

On the other hand, in the flow control device 100 of the first example embodiment, an initial calculation amount of a Dijkstra's algorithm is $O(v^2)$ and this calculation is executed t times, where t is the number of vertexes in a partial set of vertexes. The maximum number of additions for the shortest path selection count 803 is ext, where e is the number of edges. A calculation amount for calculation of the weight for spanning minimum tree 805 illustrated in FIG. 13 is 6 (2 times for addition, 3 times for shift, and 1 time for subtraction)×e. A calculation amount for a Prim's algorithm is $O(v^2)$. A calculation amount for processing by the intra-delivery tree edge non-hold flow-processing device leaf portion removal means 733 illustrated in FIG. 13 is $O(v^2)$.

Therefore, a calculation amount in the flow control device 100 is $O((t+2)v^2+(t+6)e)$. Therefore, it is understood that the calculation amount does not increase explosively as the calculation amount $O((v3^\tau)+v^2\times2^\tau+v^3)$ for determining a minimum Steiner tree.

As described above, the flow control device 100 narrows down links 400 by using a shortest path selection count 803, reflects an external NW edge partial set hold flow-processing device connection determination flag 804 and the shortest path selection count 803 to a weight for spanning minimum tree 805, calculates an approximation solution of a delivery range limited spanning minimum tree with a small calculation amount, specifies a partial set of edges connected to an external network, and thereby can suppress bandwidth resource consumption of a flow-processing device that is unnecessarily for delivery during multipoint-to-multipoint communication.

Second Example Embodiment

Figure 22:
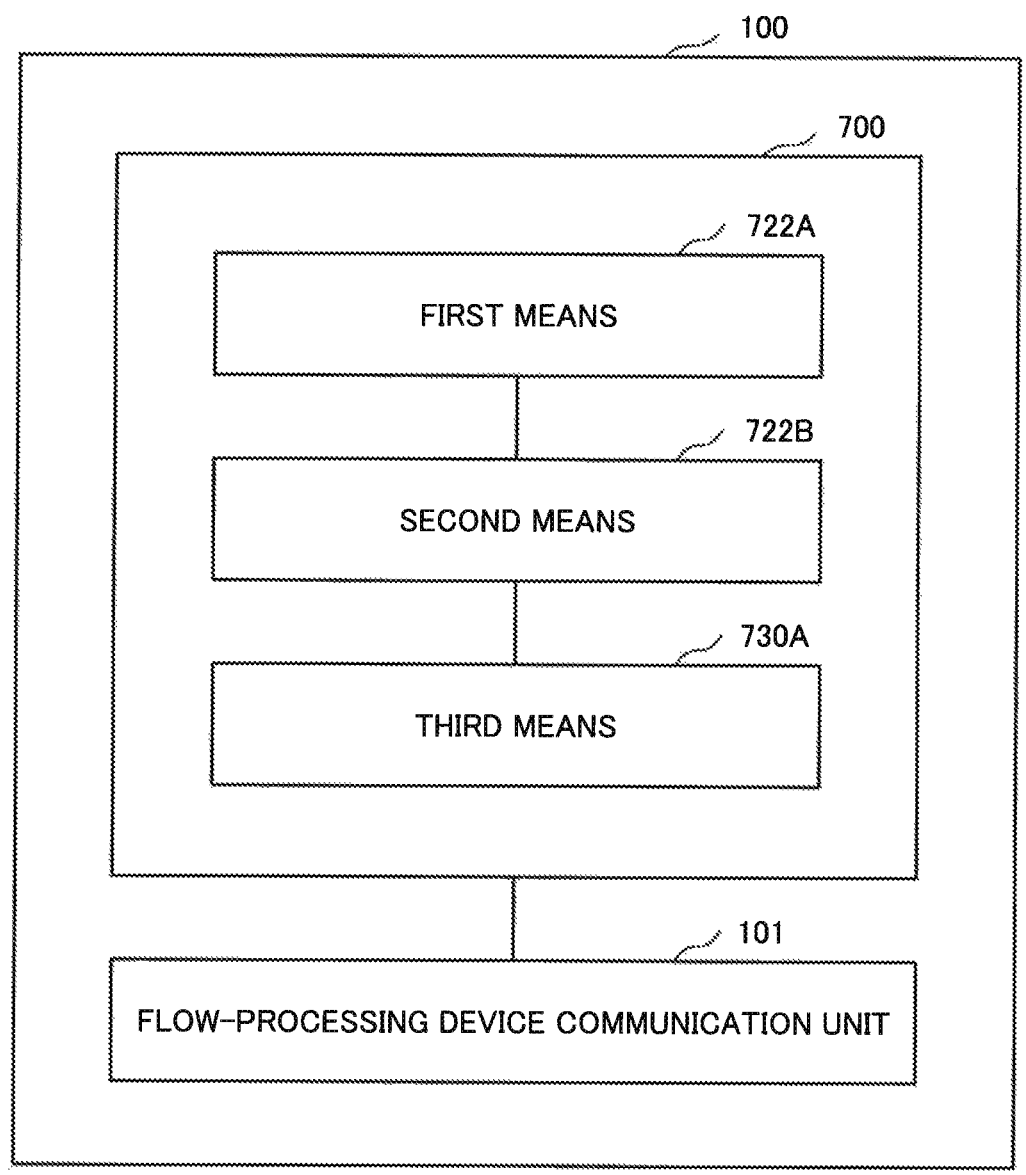
FIG. 22 is a configuration example of a flow control device of a second example embodiment.

FIG. 22 is a diagram illustrating a configuration example of a flow control device 100 in a second example embodiment of the present invention.

A communication system in the second exempla embodiment is similar to the communication system of the first example embodiment exemplarily illustrated in FIG. 1, and therefore detailed description will be omitted.

As illustrated in FIG. 22, the flow control device 100 in the second example embodiment includes a first means 722A, a second means 722B, a third means 730A, and a flow-processing device communication unit 101. The first means 722A and the second means 722B correspond to the inter-physically external NW edge hold flow-processing devices shortest path equivalent cost multipath calculation means 722, and the third means 730A corresponds to the spanning minimum tree calculation unit 730.

The first means 722A calculates, for each of predetermined flow-processing devices located at an edge to an external network, a shortest path to another of the predetermined flow-processing devices. The predetermined flow-processing device is a flow-processing device including a port connected to an external network. The first means 722A calculates an equivalent cost multipath as the shortest path. Predetermined communication is multipoint-to-multipoint communication. Further, the first means 722A calculates, when there are a plurality of links between flow-processing devices, a shortest path by using a link selected based on a priority set for the link.

The second means 722B determines, based on the number of times a link between flow-processing devices is included in a shortest path, a candidate link used in a communication path for the predetermined communication. The second means 722B excludes, for example, when the number of times of the link between flow-processing devices being included in a shortest path is 0, the link from candidate links used in the communication path for the predetermined communication.

The third means 730A calculates, as a candidate communication path for the predetermined communication, a delivery tree in which a predetermined flow-processing device is a root node, based on the candidate link determined by the second means 722B. The third means removes, for example, a portion in which a predetermined flow-processing device is located as a leaf from the delivery tree.

Figure 23:
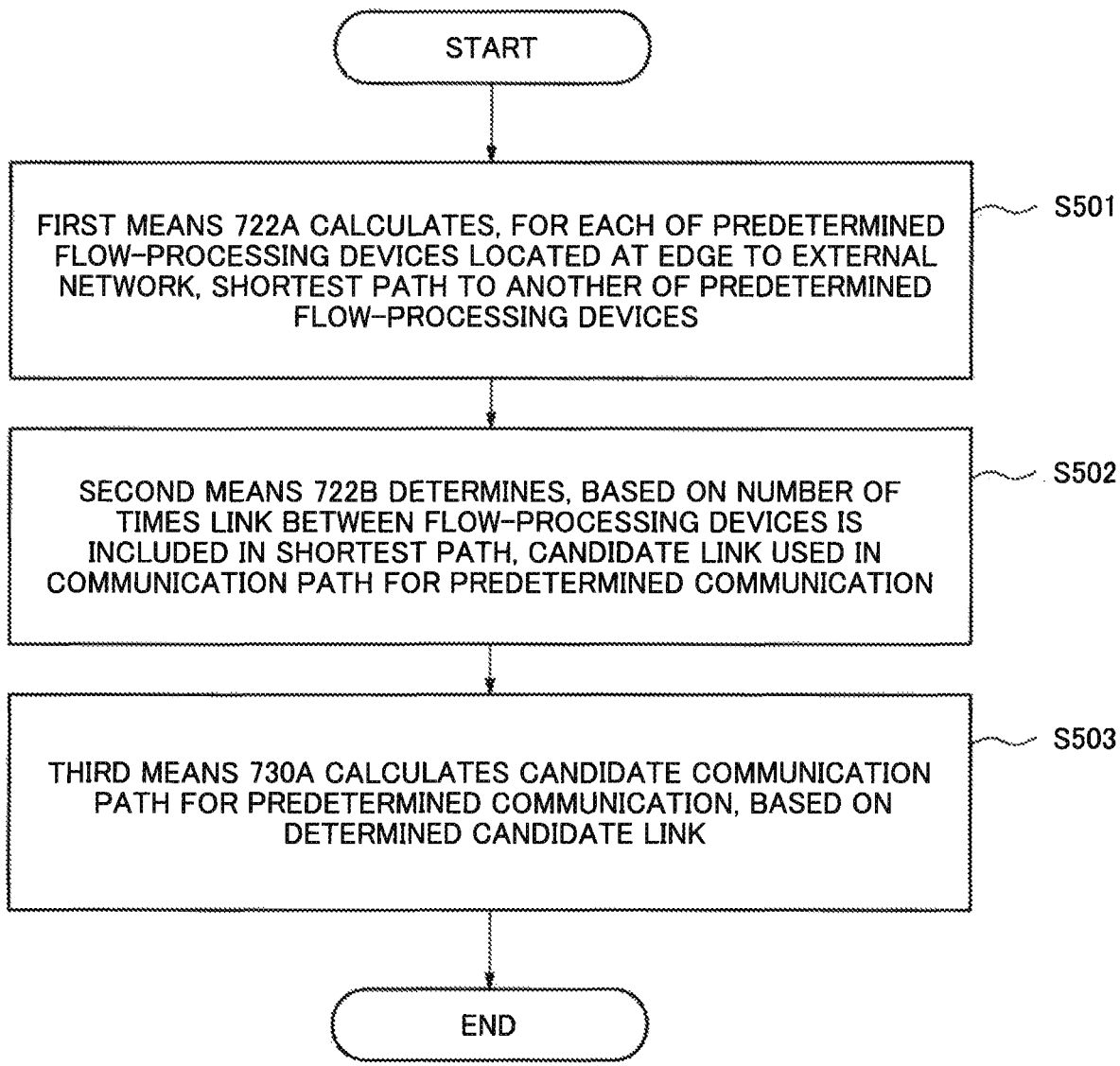
FIG. 23 is a flowchart illustrating an operation example of the flow control device 100 in the second example embodiment.

FIG. 23 is a diagram illustrating an operation example of the flow control device 100 in the second example embodiment. As illustrated in FIG. 23, the first means 722A of the flow control device 100 calculates, for each of predetermined flow-processing devices located at an edge to an external network, a shortest path to another of the predetermined flow-processing device (S501).

The second means 722B of the flow control device 100 determines, based on the number of times a link between flow-processing devices is included in a shortest path, a candidate link used in a communication path for the predetermined communication (S502).

The third means 730A of the flow control device 100 calculates a candidate communication path for the predetermined communication, based on the determined candidate link (S503).

As described above, the flow control device 100 in the second example embodiment narrows down candidate links to those used in a communication path for predetermined communication and calculates a candidate for the predetermined communication path, based on the candidate links obtained by the narrowing-down. The flow control device 100 excludes, for example, a link to a flow processing device that is unnecessarily for delivery, from links used in the communication path. Therefore, the communication system in the second example embodiment does not perform delivery to a flow-processing device that is unnecessarily for delivery in multipoint-to-multipoint communication, and therefore an increase in consumption of a bandwidth of a network can be suppressed. While exemplary embodiments of the present invention have been described, the present invention is not limited to each of the above-described exemplary embodiments. The present invention can be carried out based on variations, substitutions, and adjustments of the example embodiments. Further, the present invention can be carried out using any combination of the example embodiments. In other words, the present invention includes various variations and modifications that could be realized according to the overall disclosed contents and the technical concept of the present description. Further, the present invention is also applicable to a technical field of a software-defined network (SDN).

While the present invention has been particularly shown and described with reference to the example embodiments thereof, the present invention is not limited to the embodiments. It will be understood by those of ordinary skill in the art that various changes in form and details may be made therein without departing from the spirit and scope of the present invention as defined by the claims.

100 Flow control device
200 Flow-processing device
300 Node
400 Link
500 Physically external NW edge
600 Virtual network
601 Virtual L2SW
602 Virtually external NW edge

The invention claimed is:

1. A flow control device for controlling a plurality of flow-processing devices that process a packet for predetermined communication, the flow control device comprising:
   a memory storing instructions; and
   one or more processors configured to execute the instructions to:

calculate, for each of predetermined flow-processing devices located at an edge to an external network, a shortest path to another of the predetermined flow-processing devices;

determine, based on a number of times a link between flow-processing devices is included in the shortest path, a candidate link used in a communication path for the predetermined communication; and calculate a candidate communication path for the predetermined communication, based on the determined candidate link.

2. The flow control device according to claim 1, wherein an equivalent cost multipath is calculated as the shortest path.

3. The flow control device according to claim 1, wherein, when there are a plurality of links between flow-processing devices, the shortest path is calculated by using a link selected based on a priority set to the links.

4. The flow control device according to claim 1, wherein, when a number of times of a link between flow-processing devices being included in the shortest path is 0, the link is excluded from candidate links used in the communication path for the predetermined communication.

5. The flow control device according to claim 1, wherein, based on the determined candidate link, a delivery tree in which the predetermined flow-processing device is a root node is calculated, as the candidate communication path for the predetermined communication.

6. The flow control device according to claim 5, wherein, from the delivery tree, a portion in which a predetermined flow-processing device is located as a leaf is removed.

7. The flow control device according to claim 1, wherein the predetermined communication is multipoint-to-multipoint communication.

8. The flow control device according to claim 1, wherein the predetermined flow-processing device is a flow-processing device including a port connected to an external network.

9. A flow control method in a flow control device for controlling a plurality of flow-processing devices that process a packet for predetermined communication, the flow control method comprising:

calculating, for each of predetermined flow-processing devices located at an edge to an external network, a shortest path to another of the predetermined flow-processing devices;

determining, based on a number of times a link between flow-processing devices is included in the shortest path, a candidate link used in a communication path for the predetermined communication; and calculating a candidate communication path for the predetermined communication, based on the determined candidate link.

10. A non-transitory computer readable storage medium recording thereon a program causing a computer for a flow control device for controlling a plurality of flow-processing devices that process a packet for predetermined communication, to perform processes comprising:

calculating, for each of predetermined flow-processing devices located at an edge to an external network, a shortest path to another of the predetermined flow-processing devices;

determining, based on a number of times a link between flow-processing devices is included in the shortest path, a candidate link used in a communication path for the predetermined communication; and calculating a candidate communication path for the predetermined communication, based on the determined candidate link.

* * * * *